United States Patent
Yamaguchi et al.

(10) Patent No.: US 7,692,869 B2
(45) Date of Patent: Apr. 6, 2010

(54) IMAGE-TAKING LENS UNIT

(75) Inventors: Shinji Yamaguchi, Osaka (JP); Tetsuo Kohno, Suita (JP); Genta Yagyu, Nishinomiya (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 939 days.

(21) Appl. No.: 11/388,167

(22) Filed: Mar. 23, 2006

(65) Prior Publication Data

US 2007/0091200 A1 Apr. 26, 2007

(30) Foreign Application Priority Data

Oct. 20, 2005 (JP) .............................. 2005-305257

(51) Int. Cl.
*G02B 15/14* (2006.01)
(52) U.S. Cl. .................... 359/676; 359/678; 359/726
(58) Field of Classification Search ................ 359/676, 359/678, 686–690, 726–736
See application file for complete search history.

(56) References Cited

U.S. PATENT DOCUMENTS

| 2003/0156832 A1* | 8/2003 | Nomura et al. | ............... 396/72 |
| 2006/0066955 A1* | 3/2006 | Satori et al. | .................. 359/687 |

FOREIGN PATENT DOCUMENTS

| JP | 07-333505 A | 12/1995 |
| JP | 08-248318 A | 9/1996 |
| JP | 2000-187159 A | 7/2000 |
| JP | 2000-187160 A | 7/2000 |
| JP | 2003-043354 A | 2/2003 |
| JP | 2003-156789 A | 5/2003 |
| JP | 2003-169236 A | 6/2003 |
| JP | 2004-102089 A | 4/2004 |

* cited by examiner

*Primary Examiner*—Darryl J Collins
(74) *Attorney, Agent, or Firm*—Sidley Austin LLP

(57) ABSTRACT

An image-taking lens unit includes: a variable magnification optical system for forming an optical image of an object with a variable magnification; and an image sensor for converting the optical image into an electrical signal. The image-taking lens unit changes the shape thereof between a photographing state and a non-photographing state. The variable magnification optical system has a plurality of lens groups for performing magnification variation by changing intervals therebetween and a reflective surface for bending an optical axis. At least one of the plurality of lens groups is a movable group that moves during magnification variation. The reflective surface is kept in fixed position during magnification variation or focusing. In transition from the photographing state to the non-photographing state, at least the reflective surface moves so that at least part of the movable group is stored into a space left after the movement of the reflective surface.

18 Claims, 26 Drawing Sheets

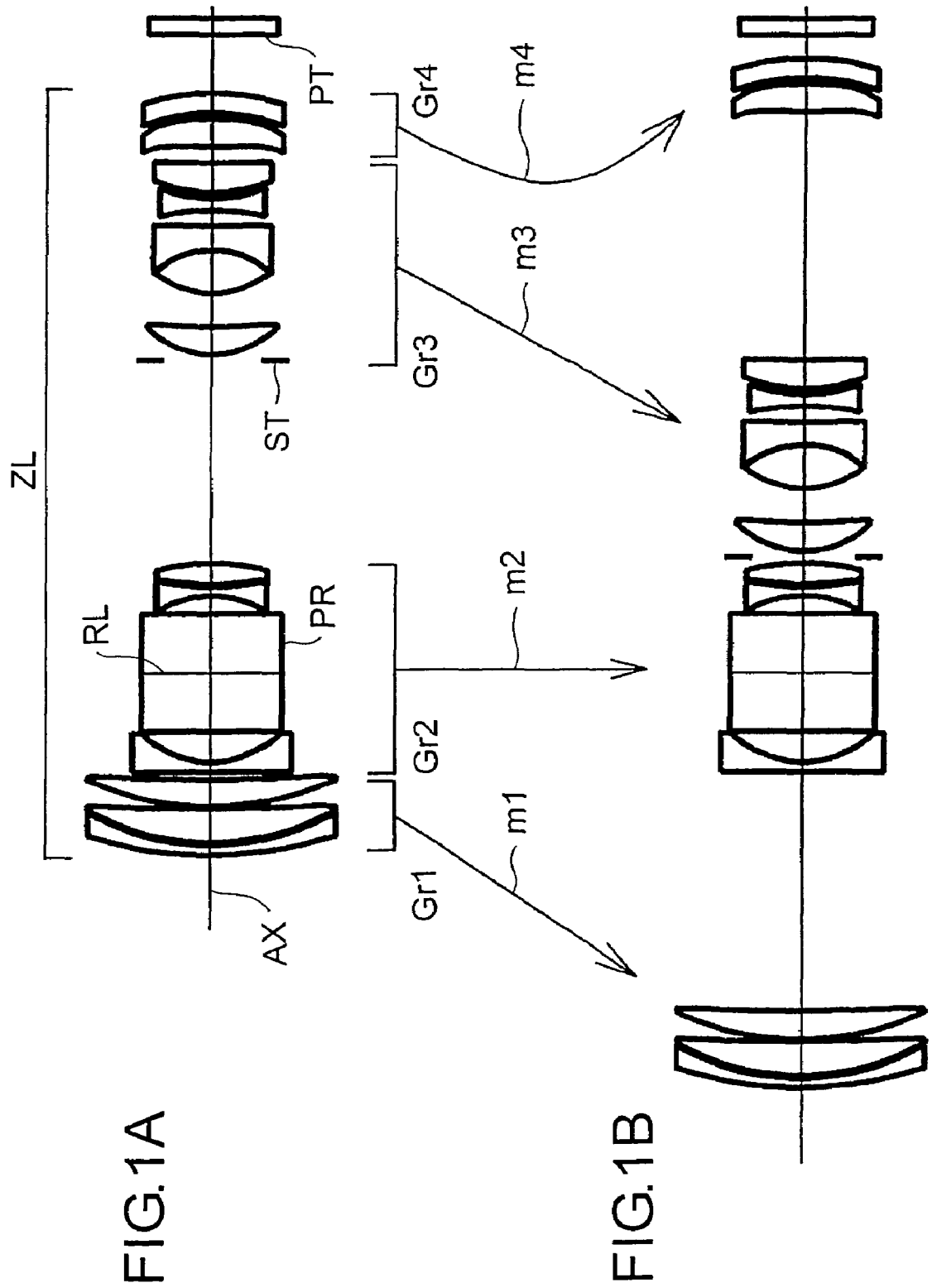

FNO=2.88

(W)
— d
---- SC

-0.1  0.1
SPHERICAL  SINE
ABERRATION CONDITION

Y'=4.5

---- DM
— DS

-0.1  0.1
ASTIGMATISM

Y'=4.5

-5.0  5.0
DISTORTION %

FNO=4.68

(M)
— d
---- SC

-0.1  0.1
SPHERICAL  SINE
ABERRATION CONDITION

Y'=4.5

---- DM
— DS

-0.1  0.1
ASTIGMATISM

Y'=4.5

-5.0  5.0
DISTORTION %

FNO=5.42

(T)
— d
---- SC

-0.1  0.1
SPHERICAL  SINE
ABERRATION CONDITION

Y'=4.5

---- DM
— DS

-0.1  0.1
ASTIGMATISM

Y'=4.5

-5.0  5.0
DISTORTION %

FNO=3.43

(W)

— d
----- SC

-0.1   0.1
SPHERICAL SINE
ABERRATION CONDITION

Y'=4.5

----- DM
— DS

-0.1   0.1
ASTIGMATISM

Y'=4.5

-5.0   5.0
DISTORTION %

FNO=4.92

(M)

— d
----- SC

-0.1   0.1
SPHERICAL SINE
ABERRATION CONDITION

Y'=4.5

----- DM
— DS

-0.1   0.1
ASTIGMATISM

Y'=4.5

-5.0   5.0
DISTORTION %

FNO=5.35

(T)

— d
----- SC

-0.1   0.1
SPHERICAL SINE
ABERRATION CONDITION

Y'=4.5

----- DM
— DS

-0.1   0.1
ASTIGMATISM

Y'=4.5

-5.0   5.0
DISTORTION %

FNO=3.15
(W)
— d
---- SC
-0.1  0.1
SPHERICAL SINE
ABERRATION CONDITION

Y'=4.5
---- DM
— DS
-0.1  0.1
ASTIGMATISM

Y'=4.5
-5.0  5.0
DISTORTION %

FNO=4.21
(M)
— d
---- SC
-0.1  0.1
SPHERICAL SINE
ABERRATION CONDITION

Y'=4.5
---- DM
— DS
-0.1  0.1
ASTIGMATISM

Y'=4.5
-5.0  5.0
DISTORTION %

FNO=5.39
(T)
— d
---- SC
-0.1  0.1
SPHERICAL SINE
ABERRATION CONDITION

Y'=4.5
---- DM
— DS
-0.1  0.1
ASTIGMATISM

Y'=4.5
-5.0  5.0
DISTORTION %

FNO=3.37

(W)
— d
--- SC

-0.1  0.1
SPHERICAL  SINE
ABERRATION  CONDITION

Y'=4.5

--- DM
— DS

-0.1  0.1
ASTIGMATISM

Y'=4.5

-5.0  5.0
DISTORTION %

FNO=4.38

(M)
— d
--- SC

-0.1  0.1
SPHERICAL  SINE
ABERRATION  CONDITION

Y'=4.5

--- DM
— DS

-0.1  0.1
ASTIGMATISM

Y'=4.5

-5.0  5.0
DISTORTION %

FNO=5.49

(T)
— d
--- SC

-0.1  0.1
SPHERICAL  SINE
ABERRATION  CONDITION

Y'=4.5

--- DM
— DS

-0.1  0.1
ASTIGMATISM

Y'=4.5

-5.0  5.0
DISTORTION %

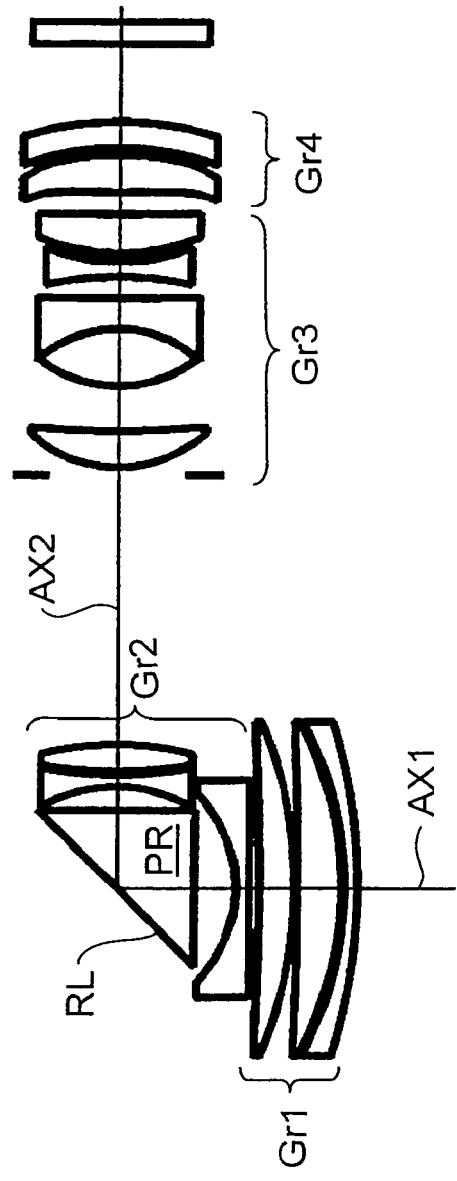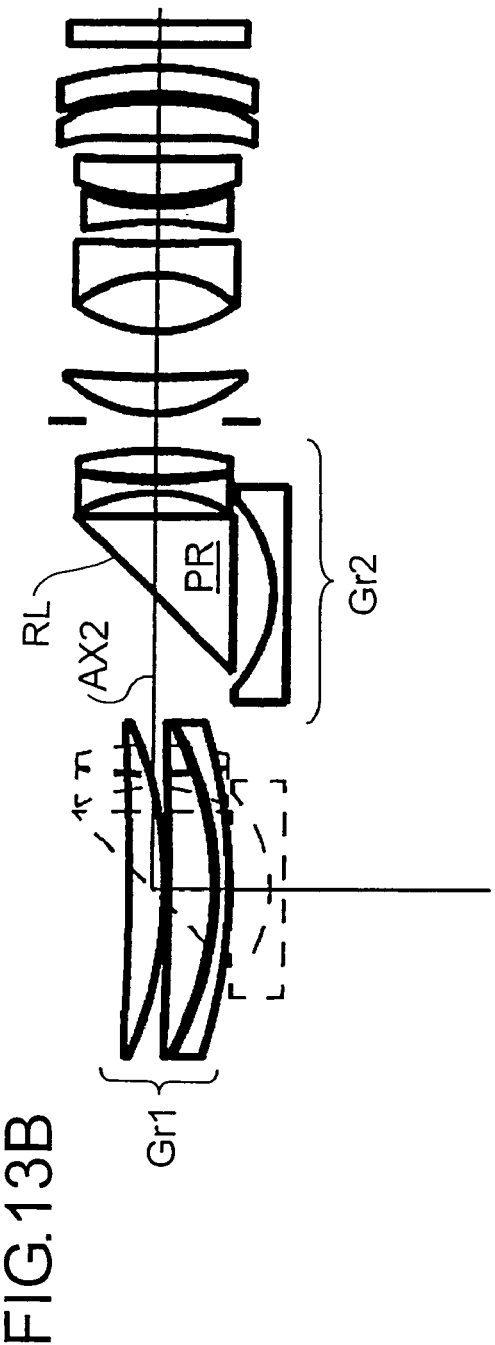
FIG.13A
FIG.13B

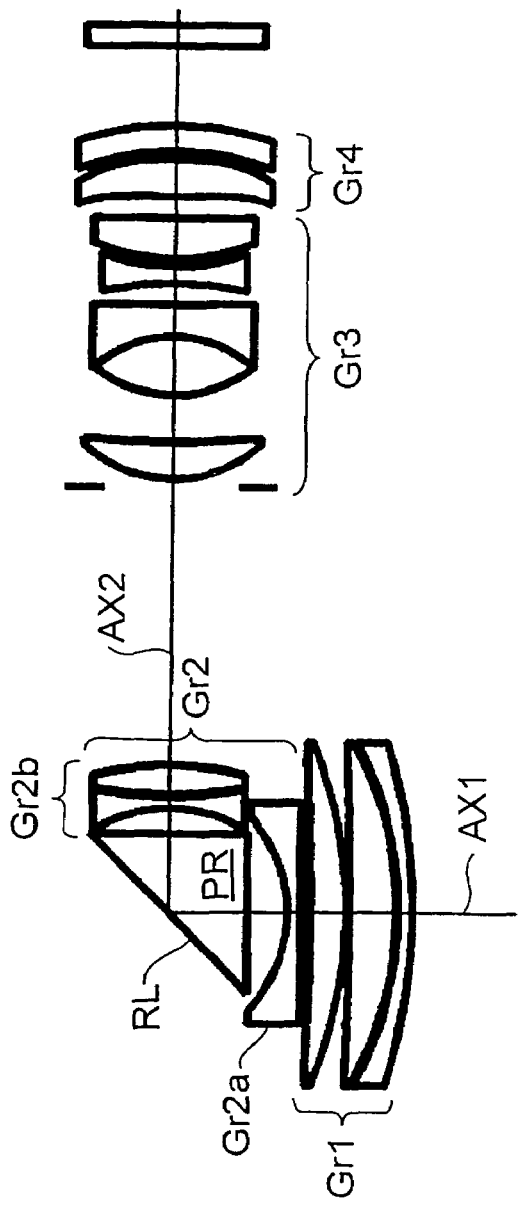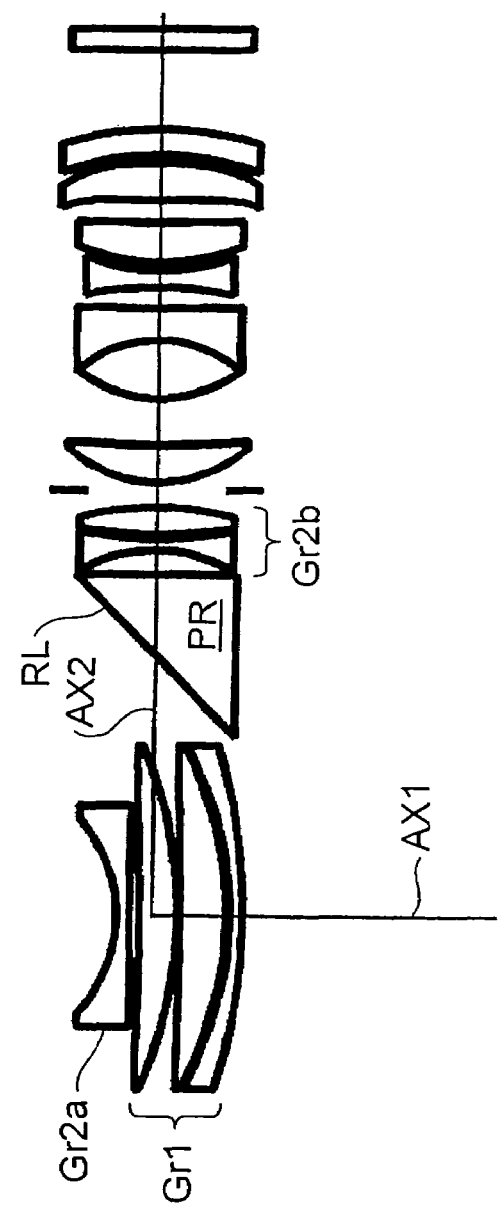
FIG.14A
FIG.14B

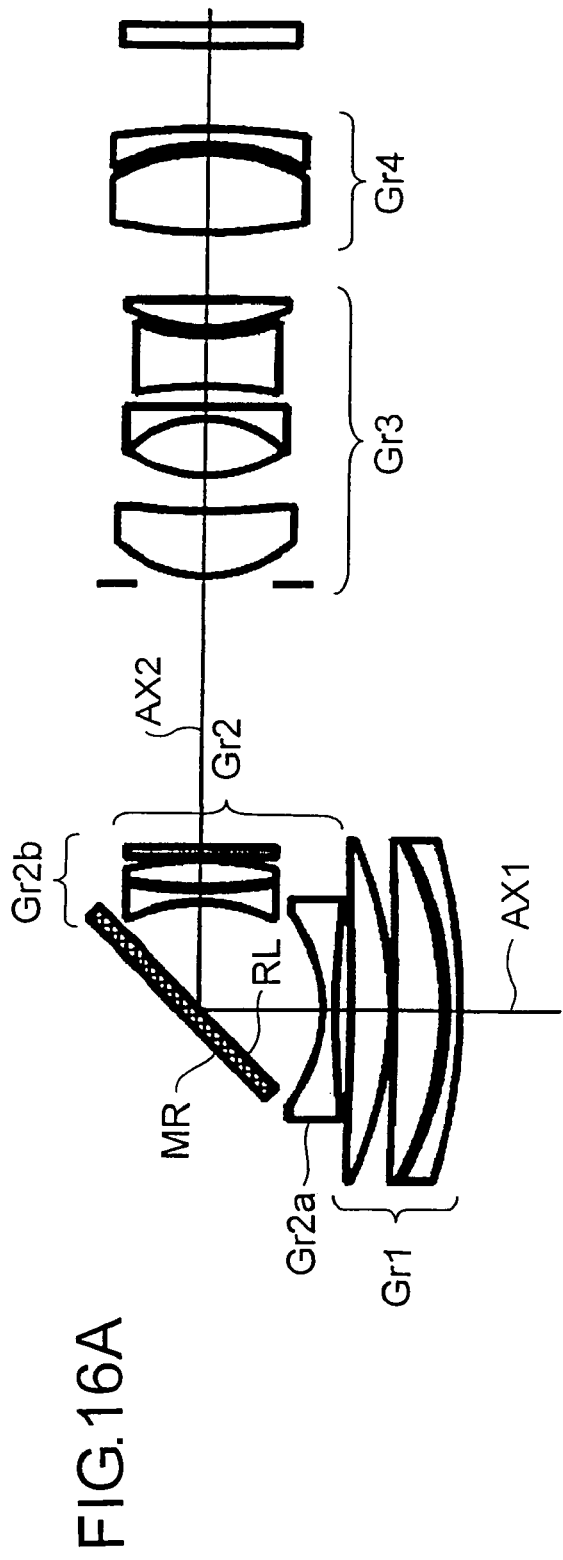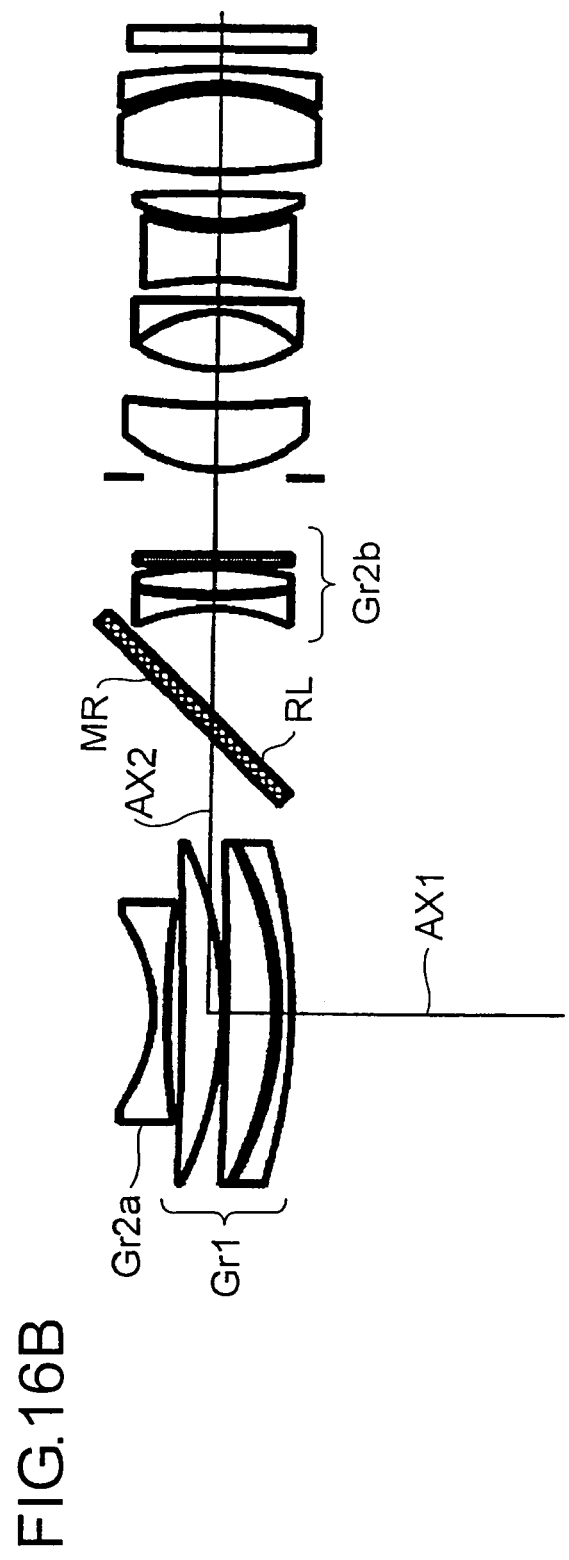
FIG.16A
FIG.16B

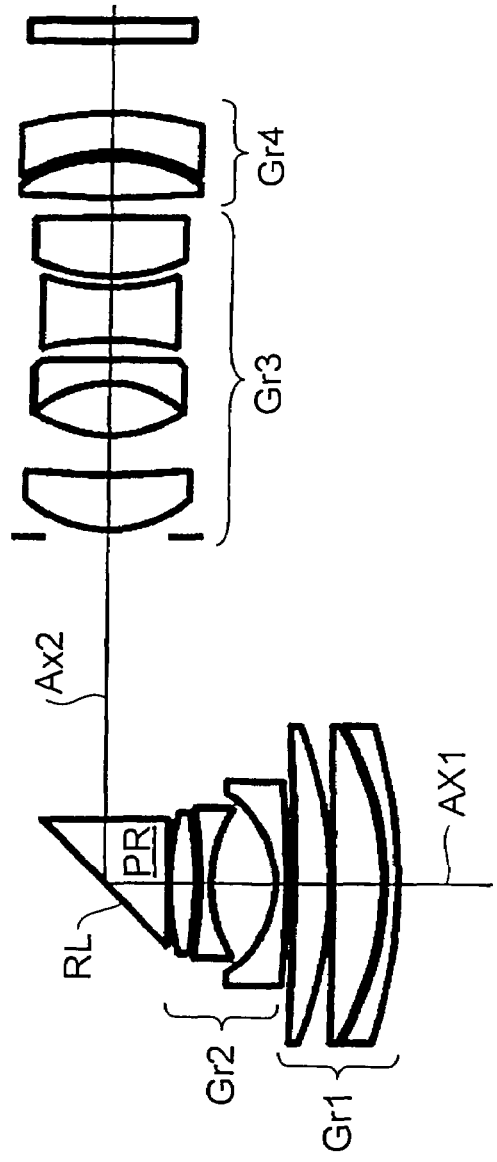
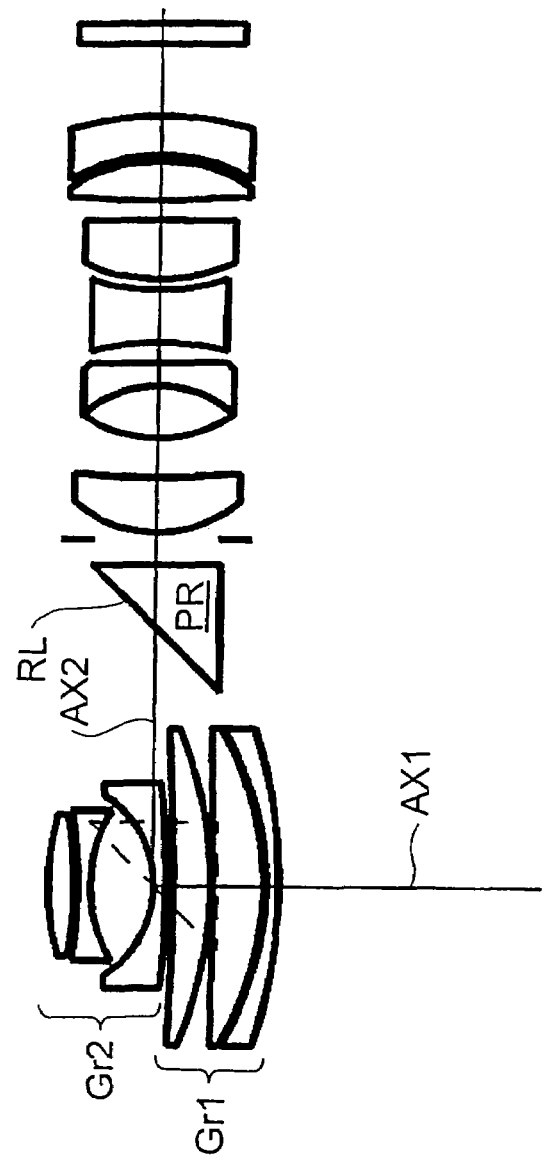
FIG.17A
FIG.17B

IMAGE-TAKING LENS UNIT

This application is based on Japanese Patent Application No. 2005-305257 filed on Oct. 20, 2005, the contents of which are hereby incorporated by reference.

BACKGROUND OF THE INVENTION

1. Field of the Invention

The present invention relates to an image-taking lens unit and more specifically to an image-taking apparatus, such as a slim, high-variable-magnification digital camera, digital appliance with image input capability, or the like, and to an image-taking lens unit suitable therefor.

2. Description of Related Arts

Following the trend toward downsizing of digital cameras and video cameras in recent years, there have been needs for downsizing and slimming-down of image-taking lens units for use in these appliances. In addition, there have been increasing needs for slimmed-down of image-taking lens units that can be mounted in mobile phones, personal digital assistants, and the like. In response to these needs, patent publication 1 to 8 propose image-taking lens units slimmed-down by arranging a prism or a mirror in an image-taking lens system to bend an optical axis and providing the image-taking lens system as a bending optical system.

[Patent publication 1] Japanese Patent Application Laid-open No. H7-333505
[Patent publication 2] Japanese Patent Application Laid-open No. H8-248318
[Patent publication 3] Japanese Patent Application Laid-open No. 2003-169236
[Patent publication 4] Japanese Patent Application Laid-open No. 2000-187159
[Patent publication 5] Japanese Patent Application Laid-open No. 2000-187160
[Patent publication 6] Japanese Patent Application Laid-open No. 2004-102089
[Patent publication 7] Japanese Patent Application Laid-open No. 2003-156789
[Patent publication 8] Japanese Patent Application Laid-open No. 2003-43354

Generally speaking, using, as an image-taking lens system, a bending optical system whose optical axis is bent permits slimming-down of a camera body. However, in a case a zoom lens system is used as a bending optical system, most of the space for movable groups to move is provided inside the camera, which makes it difficult to reduce the volume of an image-taking lens unit in a non-photographing state even when a collapsible type is adopted (see patent publications 1 and 2, for example).

The bending optical systems disclosed in patent publications 3 and 7 each have on the most object side thereof a fixed group including a prism, and are constructed such that the prism moves in the non-photographing state and then lens elements located closer to the object side than the prism are stored into the emptied space. This construction permits some degree of slimming-down in a non-photographing state. However, in many cases, when the fixed group is arranged on the most object side, only one or so component is located closer to the object side than prism (for example, see patent publication 2). Thus, storing this lens element in the space after the movement of the prism can provide only small slimming-down and downsizing effect. Moreover, when a fixed group including a reflective surface is arranged on the most object side, in the event of an increase in the magnification variation ratio of the zoom lens system, the camera becomes too long vertically and horizontally, thus causing a problem that the projected area as viewed from the front of the camera increases.

The zoom lens systems disclosed in patent publications 4 to 6 each compose a bending optical system by arranging a reflective surface in a second lens group or between the second and a third lens groups. This construction permits slimming-down and downsizing with a high magnification variation ratio by controlling the projected surface as viewed from the front of the camera even. However, no consideration is given in this construction to slimming-down and downsizing in a non-photographing state; therefore, this construction is insufficient in terms of downsizing of the entire camera in all the states including a photographing state and a non-photographing state. Patent publication 8 discloses a bending optical system adopting a collapsible type that is capable of collapsing in the non-photographing state by tilting a mirror that bends the optical axis. This construction permits slimming-down of the camera, but results in a large change in the angles that a reflective surface forms with respect to the lens groups located closer to the object side and the image side than the mirror, thus making it difficult to maintain favorable location accuracy of the reflective surface.

SUMMARY OF THE INVENTION

In view of the problem described above, the present invention has been made, and it is an object of the invention to provide a compact, high variable magnification image-taking lens unit whose volume is reduced during a non-photographing state with a bending optical system that is effective for slimming-down, and to an image-taking apparatus provided therewith.

According to one aspect of the present invention, an image-taking lens unit includes: a variable magnification optical system for forming an optical image of an object with a variable magnification; and an image sensor for converting the optical image into an electrical signal. The image-taking lens unit changes the shape thereof between a photographing state and a non-photographing state. The variable magnification optical system has a plurality of lens groups for performing magnification variation by changing intervals therebetween and a reflective surface for bending an optical axis. At least one of the plurality of lens groups is a movable group that moves during magnification variation. The reflective surface is kept in fixed position during magnification variation or focusing. In transition from the photographing state to the non-photographing state, at least the reflective surface moves so that at least part of the movable group is stored into a space left after the movement of the reflective surface.

According to another aspect of the invention, an image-taking apparatus has an image-taking lens unit including: a variable magnification optical system for forming an optical image of an object with a variable magnification; and an image sensor for converting the optical image into an electrical signal. The image-taking lens unit changes the shape thereof between a photographing state and a non-photographing state. The variable magnification optical system has a plurality of lens groups for performing magnification variation by changing intervals therebetween and a reflective surface for bending an optical axis. At least one of the plurality of lens groups is a movable group that moves during magnification variation. The reflective surface is kept in fixed position during magnification variation or focusing. In transition from the photographing state to the non-photographing state, at least the reflective surface moves so that at least part of the movable group is stored into a space left after the movement of the reflective surface.

BRIEF DESCRIPTION OF THE DRAWINGS

FIG. 1A and 1B are lens construction diagrams showing magnification variation construction with the optical path straightened according to a first embodiment (Example 1) of the present invention;

FIG. 13A and 13B are lens construction diagrams showing an example of first-type collapsible construction with the optical path bent according to the first embodiment (Example 1);

FIG. 14A and 14B are lens construction diagrams showing an example of second-type collapsible construction with the optical path bent according to the first embodiment (Example 1);

FIG. 16A and 16B are lens construction diagrams showing an example of second-type collapsible construction with the optical path bent according to the second embodiment (Example 2);

FIG. 17A and 17B are lens construction diagrams showing an example of third-type collapsible construction with the optical path bent according to the third embodiment (Example 3);

DETAILED DESCRIPTION OF THE PREFERRED EMBODIMENTS

Hereinafter, an image-taking lens unit, an image-taking apparatus, and the like embodying the present invention will be described with reference to the accompanying drawings. The image-taking lens unit according to the present invention is an optical apparatus that optically takes in an image of a subject and then outputs it in the form of an electrical signal. Such an image-taking lens unit is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, portable information appliances (compact, portable information terminal, such as mobile computers, cellular phones, personal digital assistants (PDAs)), peripheral devices therefor (such as mouses, scanners, printers, memories), other digital appliances, and the like. As these examples show, by the use of an image-taking lens unit, it is possible not only to build a camera as an image-taking apparatus but also to incorporate the image-taking lens unit in various devices to provide them with a camera capability. For example, it is possible to realize, as an image-taking apparatus, a digital appliance provided with an image input capability, such as a cellular phone furnished with a camera.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking lens unit provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit transmission and reception of images, including both those connected directly to a network and those connected to a network by way of a device, such as a personal computer, having an information processing capability).

Figure 26:
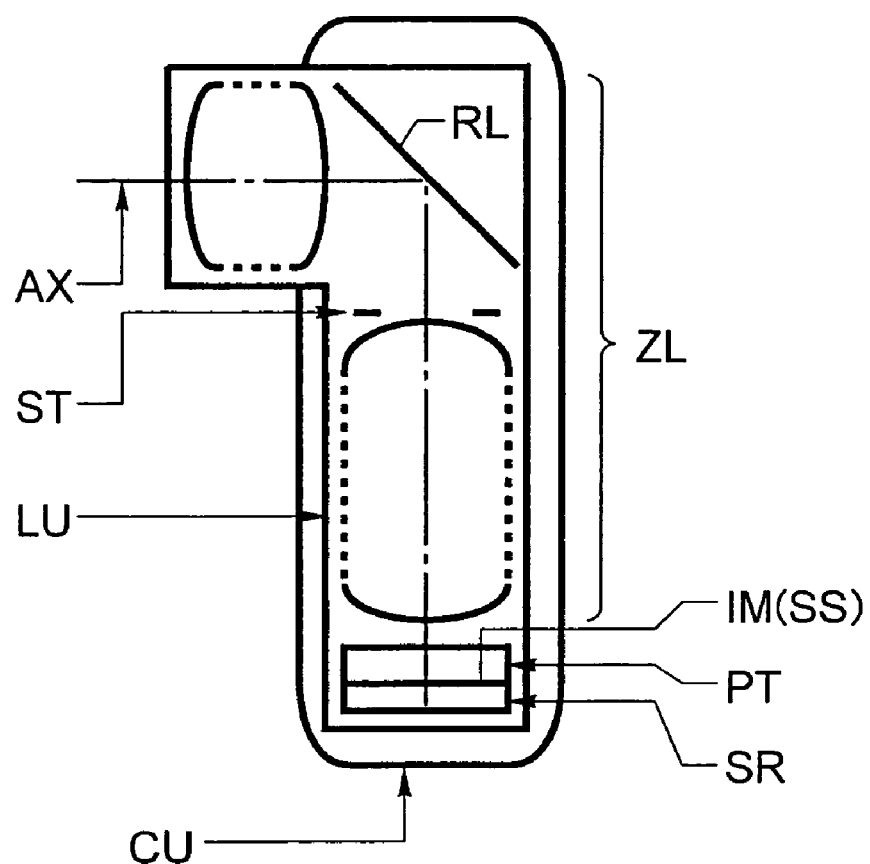
FIG. 26 is a side view in schematic cross section showing an example of outline optical construction of a camera including an image-taking lens unit.

FIG. 26 shows an example of the schematic optical construction of a camera CU (corresponding to an image-taking apparatus such as a digital camera, a digital appliance provided with an image input capability, or the like) in a schematic cross section. An image-taking lens unit LU mounted in the camera CU includes: from the object (i.e., subject) side thereof, a zoom lens system ZL (corresponding to a variable magnification optical system as an image-taking lens system, with ST representing an aperture stop) for forming an optical image (image surface IM) of an object with a variable magnification; a parallel-plane plate PT (corresponding to an optical filter such as an optical low-pass filter or infrared cut filter arranged as required, the cover glass of an image sensor SR, or the like); and an image sensor SR for converting the optical image IM formed on the light-receiving surface SS thereof by the zoom lens system ZL into an electrical signal. The image-taking lens unit LU is used as a component of the camera CU corresponding to a digital camera, a portable information appliance provided with an image input capability, or the like. When this image-taking lens unit LU is incorporated in a digital camera, the image-taking lens unit LU is usually arranged inside the body of the camera. Here, the camera capability can be realized in a desired manner that suits particular needs. For example, the image-taking lens unit LU may be built as a unit that is freely detachable from or freely rotatable relative to the body of the camera; or the image-taking lens unit LU may be built as a unit that is freely detachable from or freely rotatable relative to a portable information appliance.

The image-taking lens unit LU shown in FIG. 26 has a planar reflective surface RL arranged at some point of the optical path in the zoom lens system ZL. On the front and rear sides of the reflective surface RL, there is arranged at least one lens group each. The optical path is bent by this reflective surface RL so as to use the zoom lens system ZL as a bending optical system. In this bending, an optical beam is reflected in such a manner as to bend the optical axis AX at approximately 90 degrees (i.e., 90 degrees or substantially 90 degrees). Providing, on the optical path of the zoom lens system ZL, the reflective surface RL that bends the optical axis (that is, bends the optical path) increases the degree of freedom in the arrangement of the image-taking lens unit LU and also changes the size of the image-taking lens unit LU in the thickness-direction, thereby permitting achieving the slimmed-down appearance of the image-taking lens unit LU. In particular, as is the case with embodiments to be described below (FIGS. 1A to 1B through 4A to 4B, etc.), arranging the reflective surface RL in the second lens group Gr2 or between the second lens group Gr2 and a third lens group Gr3 permits reducing the camera thickness without enlarging the width and height of the camera CU. Furthermore, configuring a first lens group Gr1 and the third lens group Gr3 so as to be movable during magnification variation permits reducing the optical full length and diameter, permits ensuring the degree of freedom for aberration correction, and the like. The position at which the optical path is bent is not limited to some point in the zoom lens system ZL, but may be set in front of or behind the zoom lens system ZL as appropriate. The adequate bending of the optical path can effectively achieve the downsizing as well as slimmed-down appearance of the camera CU where the image-taking lens unit LU is installed.

The reflective surface RL is realized with a reflective member, such as a kind of prism (e.g., a rectangular prism) or a kind of mirror (e.g., a flat mirror). For example, in the first to fourth embodiments described below (FIGS. 1A to 1B through 4A to 4B), a prism PR or a mirror MR is used as a reflective member for bending the optical axis AX. An optical beam is reflected by one reflective surface RL in such a manner as to bend the optical axis AX of the zoom lens system ZL at approximately 90 degrees. Alternatively, the reflective member may have two or more reflective surfaces. That is, the reflective member may be used which reflects an optical beam by two or more reflective surfaces in such a manner as to bend the optical axis AX of the zoom lens system ZL at approximately 90 degrees. The optical mechanism for bending the optical path is not limited to reflection, but reflection can be combined with refraction or diffraction. That is, a reflective member including a reflective surface, a refractive surface, a diffractive surface, or those in combination may be used. The prism PR or the mirror MR used in the first to fourth embodiments below has no optical power (that is, a quantity defined as the reciprocal of the focal length). It is, however, also possible to give an optical power to the reflective member for bending an optical path (FIGS. 19A, 19B, 20A, and 20B). For example, the reflective surface RL, the light-entrance-side surface, the light-exit-side surface of the prism PR, the reflective surface RL of the mirror MR, and the like may share the optical power of the zoom lens system ZL. This makes it possible to alleviate the burden on the lens elements in terms of the optical power they are responsible for, and thereby to obtain higher optical performance.

The zoom lens system ZL includes a plurality of lens groups so that the plurality of lens groups move along the optical axis AX and interval between lens groups is varied to achieve magnification variation (i.e. zooming). In the first to fourth embodiments described below, the zoom lens system ZL adopts four-group zoom construction composed of a positive, a negative, a positive, and a positive lens groups. In each of the embodiments, the first lens group Gr1, the third lens group Gr3, and a fourth lens group Gr4 are movable groups. The image-taking lens system to be used in the image-taking lens unit LU is not limited to the zoom lens system ZL. Instead of the zoom lens system ZL, other types of variable magnification optical systems (for example, a variable-focal-length imaging optical system such as a varifocal lens system or a lens system that permits switching among a plurality of focal lengths) may be used as an image-taking lens system.

An optical image to be formed by the zoom lens system ZL passes through the optical low-pass filter (corresponding to the parallel-plane plate PT shown in FIG. 26) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moiré. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter in the image-taking lens system.

Used as the optical low-pass filter is a birefringence-type low-pass filter, a phase-type low-pass filter, or the like. Examples of birefringence-type low-pass filters include those made of a birefringent material such as quartz having a crystal axis appropriately aligned in a predetermined direction and those composed of wavelength plates or the like, which change the polarization plane, laid on one another. Examples of phase-type low-pass filters include those that achieve required optical cut-off frequency characteristics by exploiting diffraction.

Used as the image sensor SR is a solid-state image sensor such as a CCD (charge-coupled device) or CMOS (complementary metal oxide semiconductor) sensor having a plurality of pixels. The optical image formed (on the light-receiving surface SS of the image sensor SR) by the zoom lens system ZL is converted into an electrical signal by the image sensor SR. The signal produced by the image sensor SR is subjected to predetermined digital image processing, image compression processing, or the like as required, and is recorded into a memory (such as a semiconductor memory or an optical disk) as a digital video signal; in some cases, the signal is transferred to another appliance through a cable or after being converted into an infrared signal.

In the image-taking lens unit LU shown in FIG. 26, the zoom lens system ZL performs reduced projection from the subject on the enlargement side to the image sensor SR on the reduction side. The use of a display element for displaying a two-dimensional image (for example, liquid crystal display element) instead of the image sensor SR, plus the use of the zoom lens system ZL as a projection lens system, can provide an image projector for performing enlarged projection from the image display surface on the reduction side to the screen surface on the enlargement side. That is, the zoom lens system ZL of the embodiments as described below is not limited for use as an image-taking lens system, but favorably usable as a projection lens system.

As is with the image-taking lens unit LU, in an image-taking lens unit including a variable magnification optical system for forming an optical image of an object with a variable magnification and an image sensor for converting the optical image into an electrical signal, using, as a variable magnification optical system, a bending optical system having a plurality of lens groups (at least one of them is a movable group that moves during magnification variation) for performing magnification variation by changing intervals therebetween and a reflective surface for bending an optical axis permits effectively slimming-down the image-taking lens unit. However, aiming at slimming down the image-taking lens unit during non-photographing can provide only slight effect for a normal collapsible type. This is because only air-spacing located closer to the object side than the reflective surface can be slimmed down. Thus, in order to downsize the image-taking lens unit having the variable magnification optical system composed of the bending optical system as an image-taking lens system during non-photographing by changing the shape thereof between a photographing state and a non-photographing state, it is preferable that the reflective surface be kept in fixed position during magnification variation or focusing while, in transition from the photographing state to the non-photographing state, at least the reflective surface moves so that at least part of the movable group is stored into the space left after the movement of the reflective surface.

Moving at least the reflective surface and then storing at least part of the movable group into the space left after the movement of the reflective surface in the transition from the photographing state to the non-photographing state permits a reduction in the volume during non-photographing through effective usage of the space. Since a reflective member composing the reflective surface has a large volume, arranging part of the movable group in the space that has been occupied by the reflective member provides large downsizing effect. This downsizing effect permits providing a variable magnification optical system with a higher variable magnification. Moreover, the construction that part of the movable group is stored at the position of the reflective surface that is fixed during magnification variation or focusing (for example, the position opposing the image sensor, the exterior, an operation member, and the like) can also be used as a mechanism for driving the movable group during magnification variation. As a result, a compact, high variable magnification image-taking lens unit can be provided whose volume becomes smaller during non-photographing while using a bending optical system that is effective for slimming-down.

It is preferable that at least two movable groups be provided, at least one of which is located closer to the object side than the reflective surface and at least one of which is located closer to the image side than the reflective surface. That is, it is preferable that movable groups are provided closer to both the object side and the image side than the reflective surface. The arrangement of the movable groups on the object side and the image side of the reflective surface, respectively, provides a favorable balance in the vertical and horizontal sizes of the camera and a favorable balance in the lens front movement stroke, thus facilitating downsizing. A variable magnification optical system with a high variable magnification has a long full length. Therefore, with magnification variation construction in which no movable groups are arranged closer to the object side than the reflective surface, an image-taking lens unit having almost the same length as the full length of the variable magnification optical system is arranged inside the camera, thus resulting in upsizing of the camera as a whole in the vertical or horizontal direction. By contrast, with magnification variation construction in which no movable groups are arranged closer to the image side than the reflective surface, the lens front movement stroke becomes too long, thus resulting in upsizing of the camera as a whole in the thickness direction.

It is preferable that the movable group at least part of which is stored into the space left after the movement of the reflective surface be located closer to the object side than the reflective surface. The thickness of the camera during non-photographing is determined by the thickness of the movable group located closer to the object side than the reflective surface. Therefore, storing the movable groups located closer to the object side than the reflective surface into the space left after the movement of the reflective surface permits slimming down of the camera. If some air-spacing can be provided on the object side of the reflective surface in the photographing state, storing the movable group located closer to the image side than the reflective surface into the space left after the movement of the reflective surface permits downsizing of the camera in the up-down direction and the left-right direction while maintaining a fixed thickness of the camera in the photographing state and the non-photographing state.

As described above, the direction in which the camera is downsized differs between the case where the movable group at least part of which is stored into the space left after the movement of the reflective surface is located closer to the object side than the reflective surface and the case where this movable group is located closer to the image side than the reflective surface. In the former case, the portion of the camera located closer to the object side than the reflective surface becomes expansible and contractible (that is, collapsible). In the latter case, the portion of the camera located closer to the image side than the reflective surface becomes expansible and contractible. FIGS. 22A and 22B, and FIGS. 23A and 23B show the exterior of a camera of the former type in the photographing state and the non-photographing state, respectively. FIGS. 24A and 24B, and FIGS. 25A and 25B show the exterior of a camera of the latter type in the photographing state and the non-photographing state, respectively. FIGS. 22A, 23A, 24A, and 25A are front views and FIGS. 22B, 23B, 24B, and 25B are plane views, where Q1 represents a shutter button, Q2 represents a photographing mode switch, Q3 represent a sensitivity switch, and Q4 represents a lens barrel.

Figure 23A:
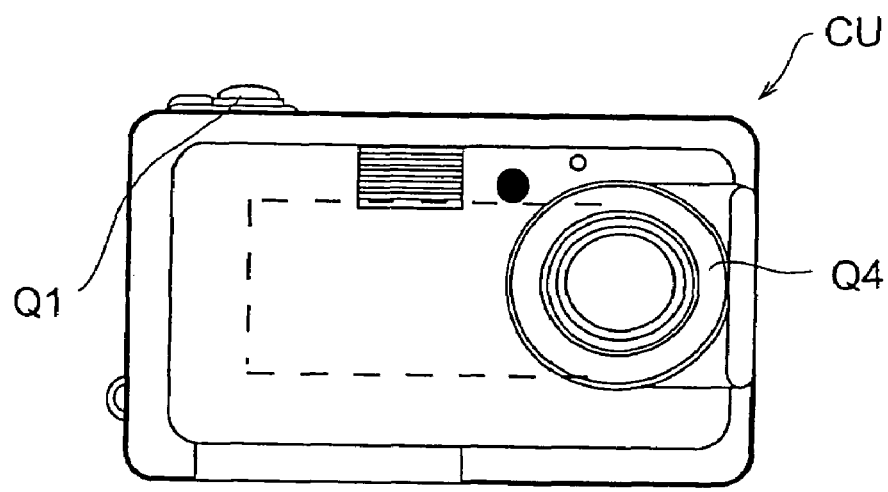
FIGS. 23A and 23B are diagrams showing the exterior of the collapsible camera in a non-photographing state.
Figure 23B:
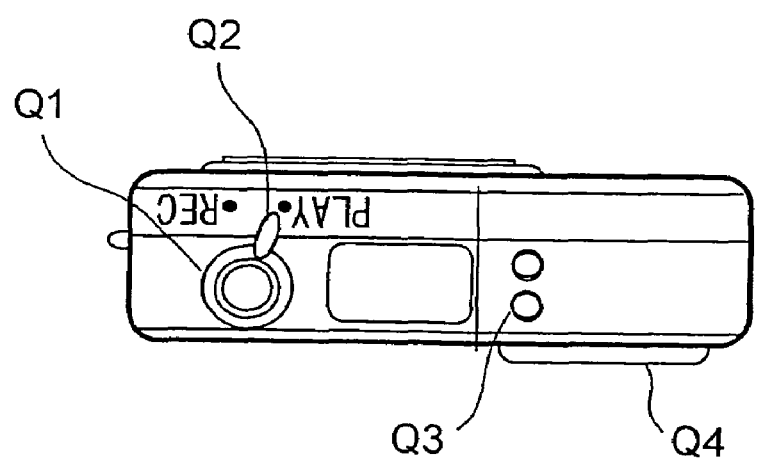
Figure 24A:
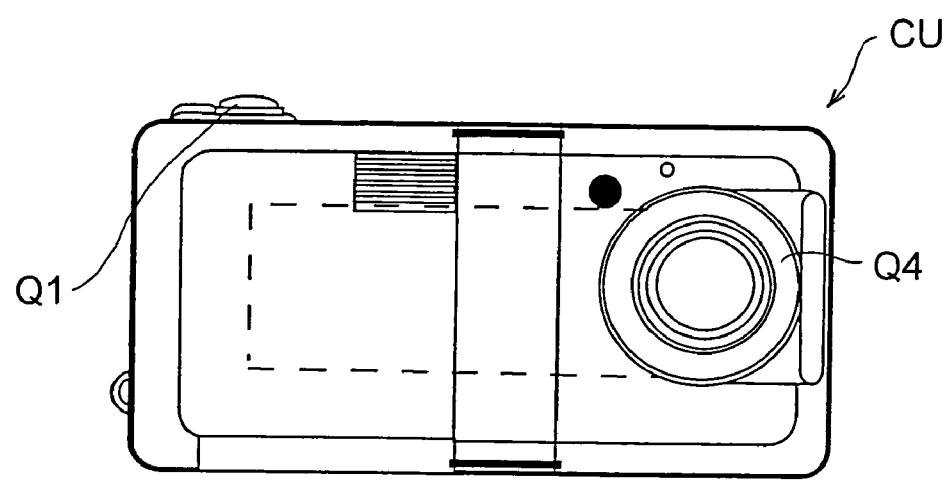
FIGS. 24A and 24B are diagrams showing the exterior of a camera, in a photographing state, of a type whose lens barrel expands and contracts in the left-right direction.
Figure 24B:
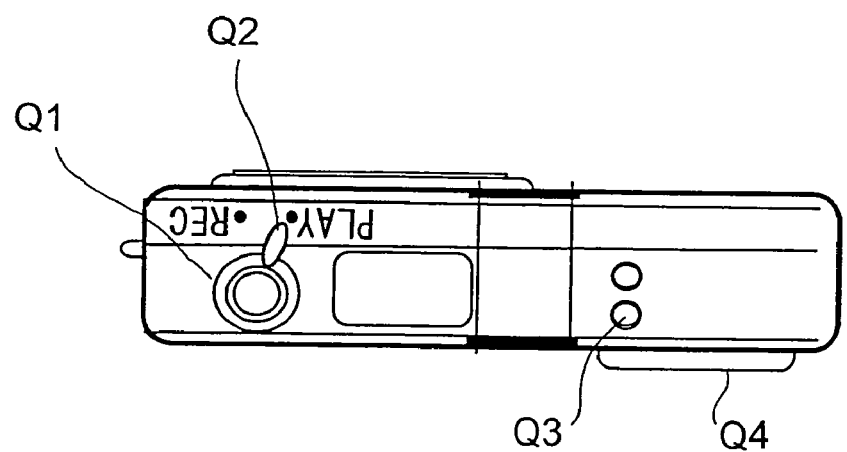
Figure 25A:
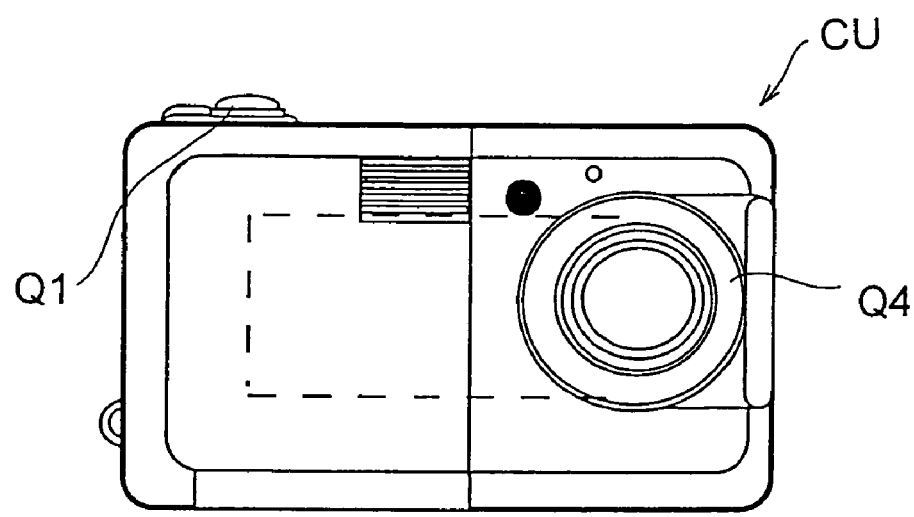
FIGS. 25A and 25B are diagrams showing the exterior of the camera, in a non-photographing state, of a type whose lens barrel expands and contracts in the left-right direction.
Figure 25B:
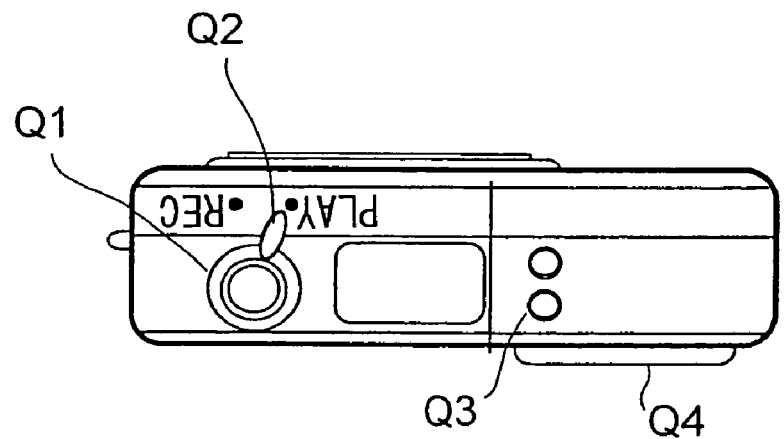

With the camera of the former type, in the transition from the photographing state to the non-photographing state, at least part of the movable group located closer to the object side than the reflective surface is stored into the space left after the movement of the reflective surface; therefore, the lens barrel Q4 protrudes in the photographing state (FIGS. 22A and 22B) and collapses in the non-photographing state (FIGS. 23A and 23B). By contrast, with the camera of the latter type, in the transition from the photographing state to the non-photographing state, at least part of the movable group located closer to the image side than the reflective surface is stored into the space left after the movement of the reflective surface; therefore, the camera becomes longer in the left-right direction in the photographing state (FIGS. 24A and 24B) and becomes shorter in left-right direction in the non-photographing state (FIGS. 25A and 25B). The camera of the latter type has a variable horizontal width since the lens barrel portion thereof from the reflective surface to the image sensor is arranged horizontally so as to expand and contract in the left-right direction.

It is preferable that, in the transition from the photographing state to the non-photographing state, the movement direction of the reflective surface differs from the movement direction of the movable group at least part of which is stored into the space left after the movement of the reflective surface. Providing the different movement directions in this manner permits reducing the volume of the image-taking lens unit in the non-photographing state and also permits achieving downsizing thereof If the movement direction of the reflective surface is the same as the movement direction of the movable group at least part of which is stored into the space left after the movement of the reflective surface, the thickness of the reflective surface and the thickness of the movable group together remain in the non-photographing state, thus resulting in smaller slimming-down effect.

It is preferable that the movement direction of the reflective surface in the transition from the photographing state to the non-photographing state be parallel to the plane perpendicular to the optical axis located closer to the object side than the reflective surface. Providing the movement direction of the reflective surface in this manner permits effective prevention of reflective-surface shake by maintaining the angle with respect to the optical axis located closer to the object side than the reflective surface. For example, in the image-taking lens unit LU shown in FIG. 26, the optical axis AX is bent by the reflective surface RL at substantially 90 degrees; therefore, the optical axis AX located closer to the image side than the reflective surface RL is parallel to the plane perpendicular to the optical axis AX located closer to the object side than the reflective surface RL. Therefore, in the transition from the photographing state to the non-photographing state, parallel movement of the reflective surface RL along the optical axis AX located closer to the image side than the reflective surface RL can provide the effect described above. In addition, rotational movement of the reflective surface in parallel to the plane perpendicular to the optical axis AX located closer to the object side than the reflective surface maintains the angle with respect to the optical axis AX located closer to the object side than the reflective surface, thus permitting providing the effect described above. In the rotational movement of the reflective surface, only the reflective member may be moved rotationally or the portion of the optical system including the reflective surface and those located thereafter (that is, those located closer to the image side than the reflective surface) may be rotationally moved altogether.

In the transition from the photographing state to the non-photographing state, in the parallel movement of the reflective surface along the optical axis located closer to the image side than the reflective surface, lens elements located closer to the image side than the reflective surface may be moved to thereby reduce variable air-spacing between the lens groups. It is further preferable that the movement of the lens elements located closer to the image side than the reflective surface be made along the optical axis located closer to the image side than the reflective surface. Moreover, at least one of the adjacent lens elements located closer to the image side than the reflective surface may be moved together with the reflective surface. Further, at least one of the adjacent lens elements located closer to the object side than the reflective surface may be moved together with the reflective surface. Since the reflective surface is kept in fixed position during variable magnification or focusing, it is preferable that the lens elements to be moved together with the reflective surface be all or part of the fixed lens group.

Figure 19A:
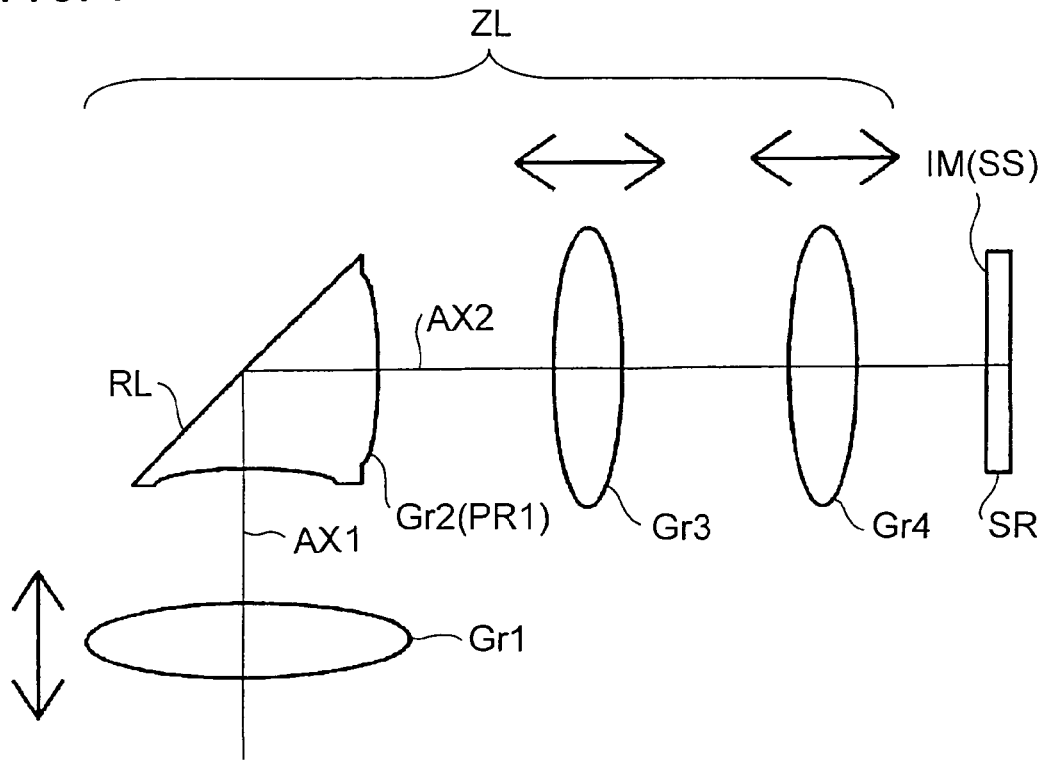
FIGS. 19A and 19B are schematic diagrams showing an example of the first-type collapsible construction in which a reflective surface moves together with an entire second lens group.
Figure 19B:
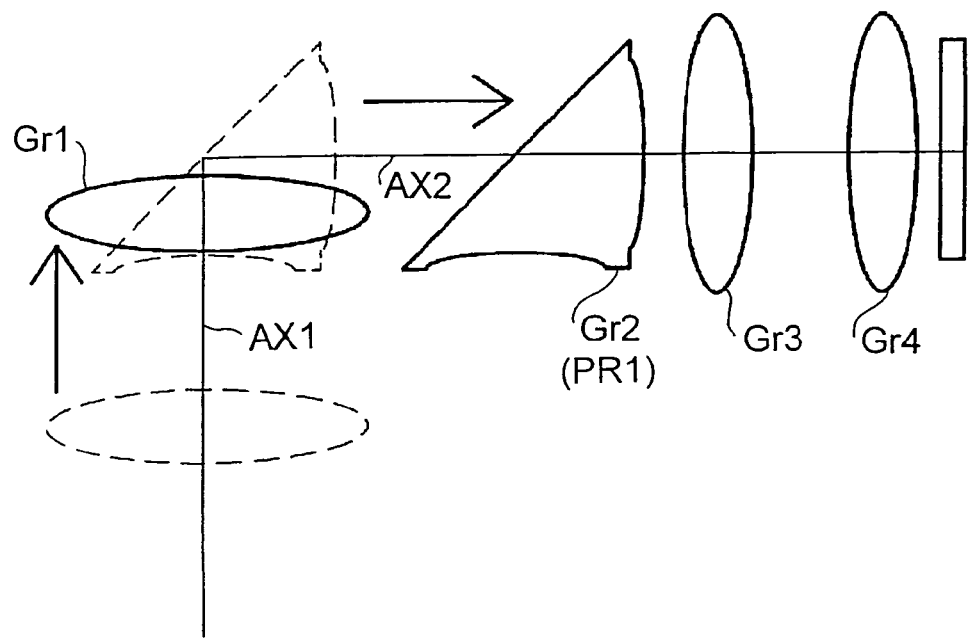
Figure 20A:
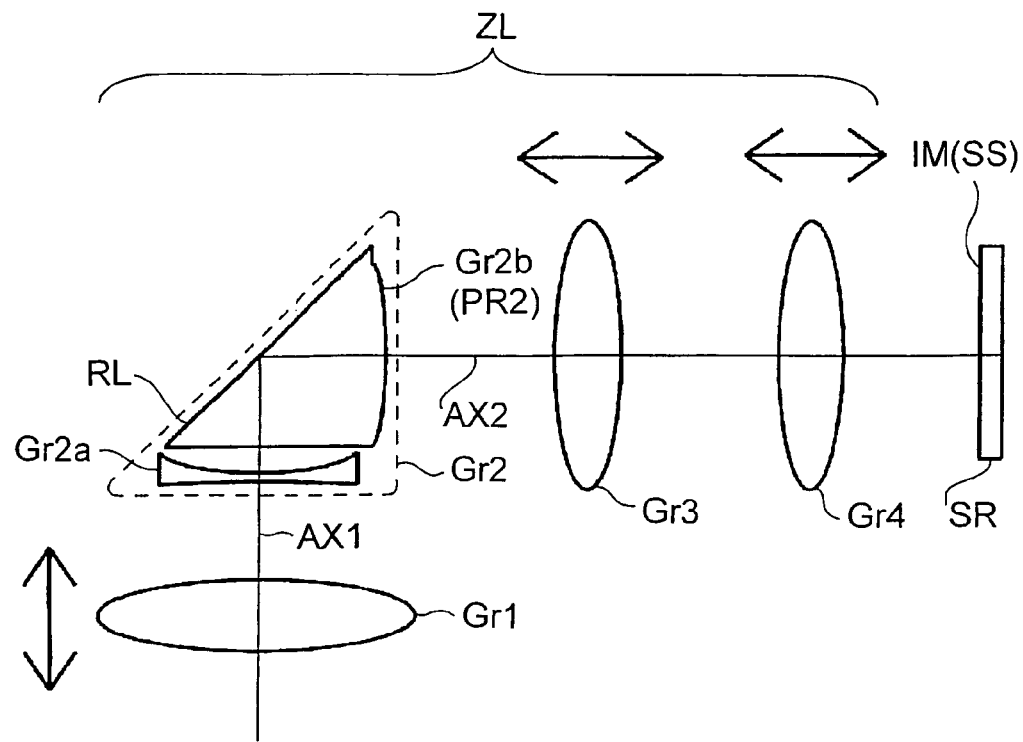
FIGS. 20A and 20B are schematic diagrams showing an example of the second-type collapsible construction in which the reflective surface moves together with part of the second lens group.
Figure 20B:
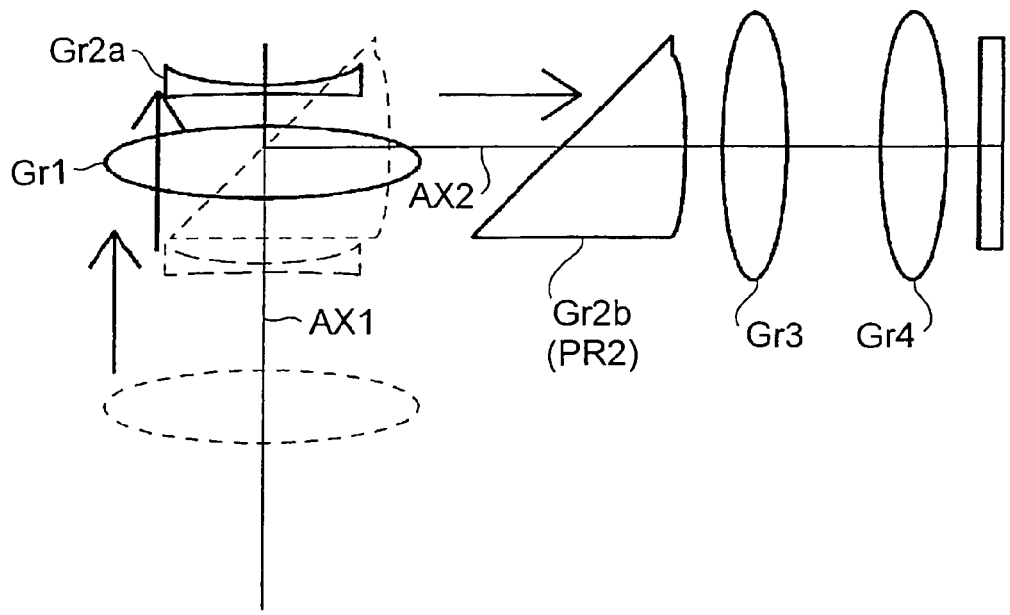
Figure 21A:
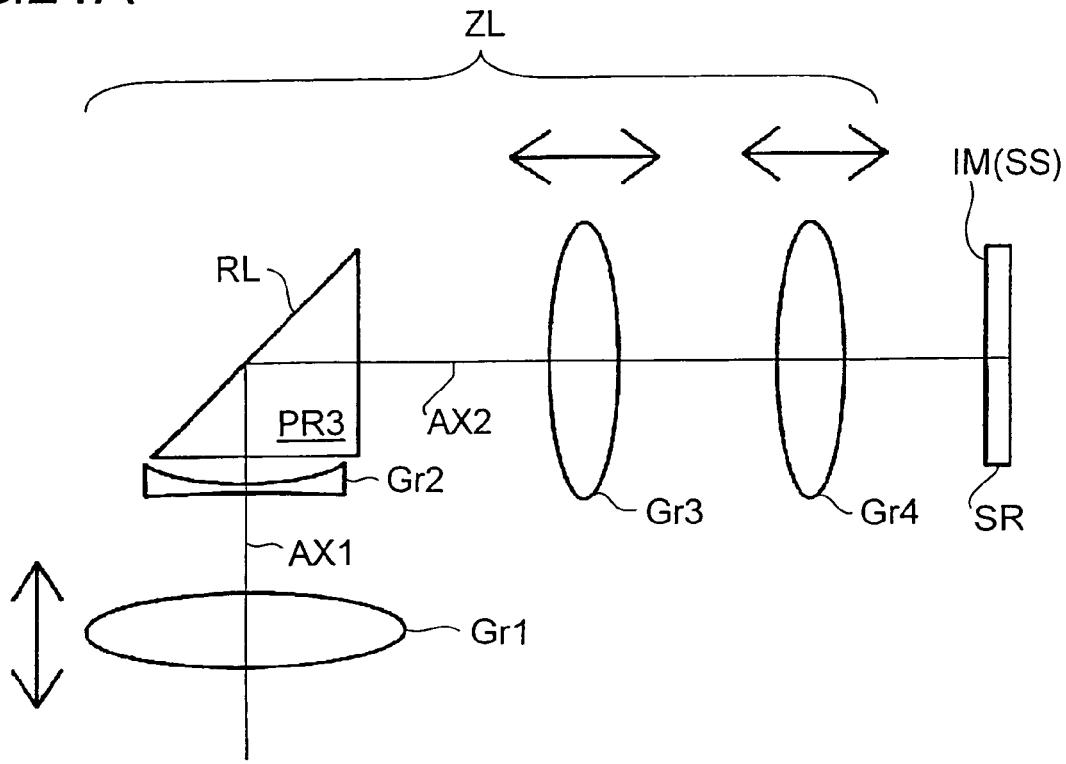
FIGS. 21A and 21B are schematic diagrams showing an example of the third-type collapse construction in which the reflective surface moves not with a lens group.
Figure 21B:
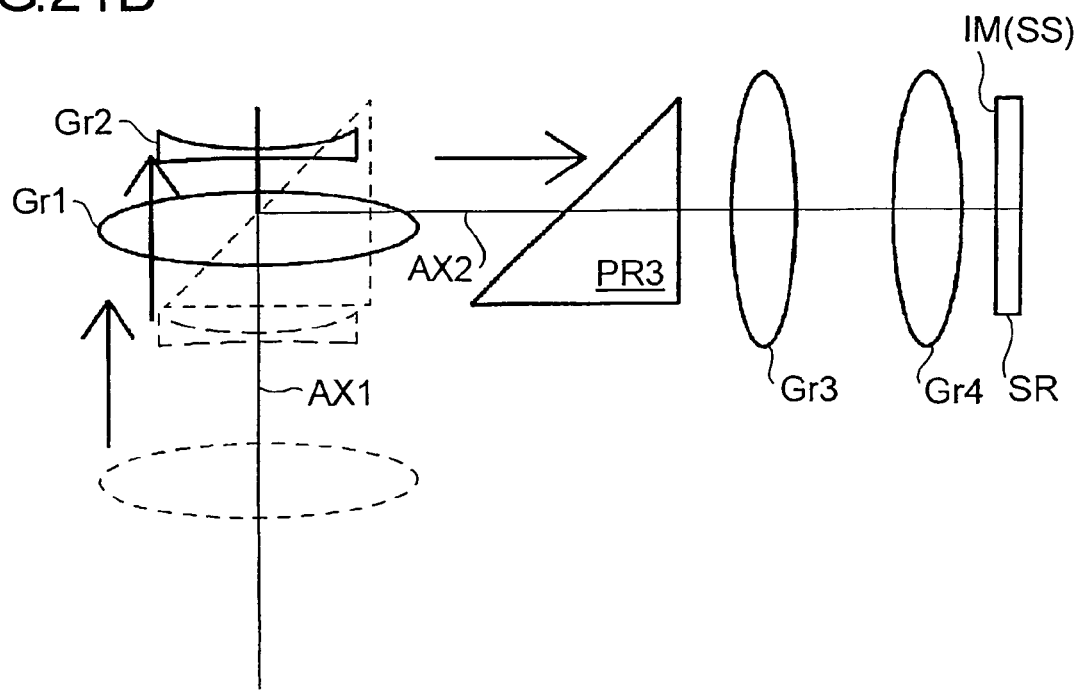
Figure 22A:
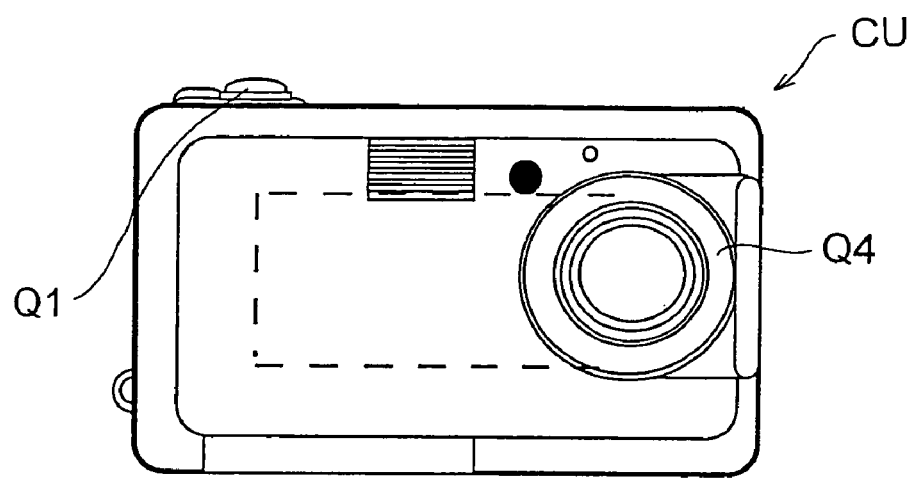
FIGS. 22A and 22B are diagrams showing the exterior of a collapsible camera in a photograph state.
Figure 22B:
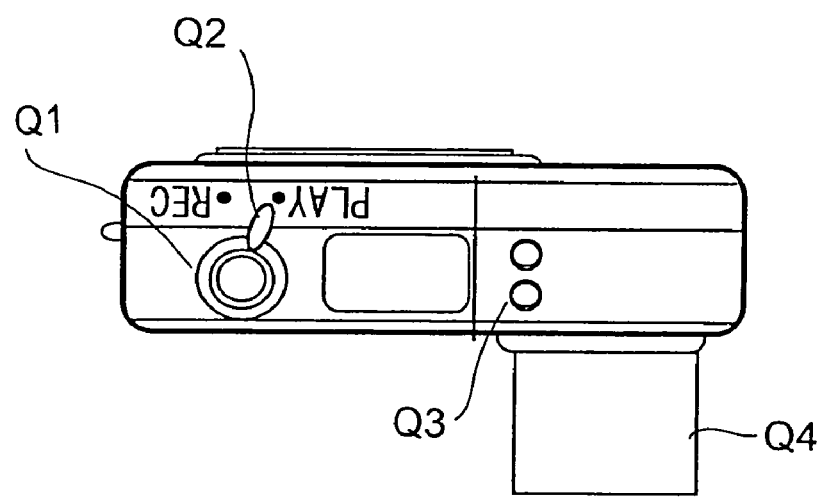

As described above, types of parallel movement of the reflective surface along the optical axis located closer to the image side than the reflective surface in the transition from the photographing state to the non-photographing state includes: a first type in which the reflective surface moves together with the entire fixed group; a second type in which the reflective surface moves together with part of the fixed group; and a third type in which the reflective surface moves not with any of the lens groups. FIGS. 19A and 19B show an example of the first type collapsible construction in which the reflective surface RL moves together with the entire second lens group Gr2. FIGS. 20A and 20B show an example of the second type collapsible construction in which the reflective surface RL moves together with part of the second lens group Gr2. FIGS. 21A and 21B show an example of the third type collapsible construction in which the reflective surface RL moves not with any of the lens groups. FIGS. 19A, 20A, and 21A show the photographing state, and FIGS. 19B, 20B, and 21B show the non-photographing state. In FIGS. 19A to 19B through 21A to 21B, Gr1 to Gr4 represent a first to a fourth lens groups, respectively, Pr1 to Pr3 represent reflection function portions PR1 to Pr3 including the reflective surface RL, AX1 represents an optical axis located closer to the object side than the reflective surface RL (object side optical axis), AX2 represents an optical axis located closer to the image side than the reflective surface RL (image side optical axis). In FIGS. 20A and 20B, Gr2a represents an object side portion of the second lens group Gr2, and Gr2b represents an image side portion of the second lens group Gr2.

Each of the examples of the collapsible constructions respectively shown in FIGS. 19A to 19B through 21A to 21B is composed of a zoom lens system ZL composed of four groups respectively having a positive, a negative, a positive, and a positive optical powers. As shown in FIGS. 19A, 20A, and 21A, the second lens group Gr2 is a fixed group, and the first, third, and fourth lens groups Gr1, Gr3, and Gr4 are movable groups. The fixed group and the movable groups are positioned with reference to the image sensor SR, the exterior, and the operation members (for example, the shutter Q1 in FIG. 22 to 25 and the like). When the reference position for collapse is assumed to be the exterior or the operation members, the image sensor SR may move during zooming or focusing.

In the example of the first type collapsible construction (FIGS. 19A and 19B), the second lens group Gr2 has a negative optical power and a reflective surface RL. The entire second lens group Gr2 is the reflection function portion PR1. The second lens group Gr2 may be composed of one prism having a reflective surface, with a light incidence side surface thereof and a light exit side surface thereof respectively having curvature. In the transition from the photographing state to the non-photographing state, the reflection function portion PR1 moves toward the image side along the image side optical axis AX2, during which the third and fourth lens groups Gr3 and Gr4 also move toward the image side along the image side optical axis AX2 in order to provide the space for the reflection function portion PR1 to be arranged. Then, the first lens group Gr1 moves toward the image side along the object side optical axis AX1 so as to be stored into the space left after the movement of the reflection function portion PR1.

In the example of the second type collapsible construction (FIGS. 20A and 20B), the second lens group Gr2 is composed of the object side portion Gr2a and the image side portion Gr2b. The image side portion Gr2b is the reflection function portion Pr2 having the reflective surface RL. The image side portion Gr2b of the second lens group Gr2 may be composed of one prism having the reflective surface RL, with a light incidence side surface thereof and a light exit side surface thereof respectively having curvature. The object side portion Gr2a of the second lens group Gr2 has a negative optical power. In the transition from the photographing state to the non-photographing state, the reflection function portion Pr2 moves toward the image side along the image side optical axis AX2, during which the third and fourth lens groups Gr3 and Gr4 also move toward the image side along the image side optical axis AX2 in order to provide the space for the reflection function portion Pr2 to be arranged. Then, the first lens group Gr1 moves toward the image side along the object side optical axis AX1 so as to be stored into the space left after the movement of the reflection function portion Pr2. In the second type, the reflective surface RL is located in the second lens group Gr2; therefore, during collapsing, the second lens group Gr2 is divided so that the reflection function portion Pr2 moves and retreats to the image side.

In the example of the third type collapsible construction (FIGS. 21A and 21B), the second lens group Gr2 has a negative optical power, and the reflection function portion Pr3 is arranged between the second lens group Gr2 and the third lens group Gr3. The reflection function portion Pr3 has the reflective surface RL but has no optical power. In the transition from the photographing state to the non-photographing state, the reflection function portion Pr3 moves toward the image side along the image side optical axis AX2, during which the third and fourth lens groups Gr3 and Gr4 also move toward the image side along the image side optical axis AX2 in order to provide the space for the reflection function portion Pr3 to be arranged. Then, the first lens group Gr1 moves toward the image side along the object side optical axis AX1 so as to be stored in the space left after the movement of the reflection function portion Pr3. Note that lens groups of the third type may be all provided as movable groups.

In any of the examples of the collapsible constructions, the reflection function portion PR1, Pr2 or Pr3 moves, whereby the first lens group Gr1 is stored into the space emptied by this movement. Thus, this construction permits efficient usage of the space located closer to the image side than the reflection function portion PR1, Pr2 or Pr3 during collapse. As a result, the volume of the entire image-taking lens unit in the non-photographing state decrease, thus permitting slimming-down of the camera. Since the reflection function portion PR1, Pr2, or Pr3 has a large volume, a large space is provided after the movement of the reflection function portion PR1, Pr2, or Pr3, thus permitting efficient usage of the space inside the image-taking lens unit during non-usage state. Since the thickness of the first lens unit Gr1 largely influences the thickness of the camera in the non-photographing state, storing the first lens unit Gr1 in the space emptied by the movement of the reflection function portion PR1, Pr2, or Pr3 is effective in the slimming-down of the camera.

In any of the examples of the collapsible constructions, the movable groups are provided on both the object side and the image side of the fixed group, thus providing a favorable balance in the vertical and horizontal sizes of the camera and a favorable balance in the lens front movement stroke, and effectively achieving downsizing of the image-taking lens unit. The movement direction of the reflection function portion PR1, Pr2, or Pr3 differs from the movement direction of the first lens unit Gr1 to be stored into the space left after the movement of reflection function portion PR1, Pr2, or Pr3, thus reducing the volume of the image-taking lens unit in the non-photographing state and achieving downsizing thereof.

In the example of the second type collapsible construction (FIGS. 20A and 20B), the second lens group Gr2 is composed of the two optical elements, namely, the object side portion Gr2a and the image side portion Gr2b. The relative position of the object side portion Gr2a and the image side portion Gr2b with respect to each other does not change during zooming or focusing but changes during collapsing. Such construction that the relative position changes permits optimizing the shape of the second lens group Gr2 after movement has occurred to suit the remaining space inside the camera, and thus is effective in downsizing during non-photographing. Therefore, the example of the second type collapsible construction (FIGS. 20A and 20B) in which the reflective surface moves together with part of the fixed group is preferable in that the positional relationship between the optical elements provided in the fixed group can be optimized in both the photographing state and the non-photographing state. More specifically, it is preferable that at least one of a plurality of lens groups be a fixed group which is fixed in position during magnification variation, that this fixed group be composed of a plurality of optical elements, that a reflective surface be positioned between the optical elements, and that the relative position of the optical elements in the fixed group do not change during variable magnification or focusing but change in the transition from the photographing state to the non-photographing state. The change in the relative position of the optical elements in the fixed group during non-photographing permits optimizing the shape of the fixed group after movement has occurred to suit the remaining space inside the camera, and thus permits effective downsizing of the camera in the non-photographing state.

Where at least two movable groups are provided, at least one of which is located closer to the object side than the reflective surface and at least one of which is located closer to the image side than the reflective surface, where, of the movable groups located closer to the object side than the reflective surface, the one located closest to the reflective surface is referred to as an "object side movable group", and where, of the movable groups located closer to the image side than the reflective surface, the one located closest to the reflective surface is referred to as an "image side movable group", it is preferable that the object side movable group and the image side movable group move monotonously in magnification variation from the wide-angle end to the telephoto end and that conditional formula (1) below be satisfied:

$$|T1/T2|<1.9 \qquad (1)$$

where

T1 represents the amount of movement of the object side movable group in magnification variation from the wide-angle end to the telephoto end, and T2 represents the amount of movement of the image side movable group in magnification variation from the wide-angle end to the telephoto end.

The conditional formula (1) defines a favorable conditional range in regard to the amount of relative movement of the movable groups located with the reflective surface in between. Satisfying this conditional formula (1) permits providing the retreat position of the reflective surface and also permits suppressing the moving distance of the collapsing side. In achieving a higher variable magnification while maintaining the front-to-back balance, increasing the moving distance T1 of the object side movable group makes it difficult to provide a collapsible construction, thus resulting in a large thickness of the camera. However, setting the amount of movement T2 of the image side movable group so that conditional formula (1) is satisfied permits both slimming-down and a higher variable magnification. If the upper limit of the conditional formula (1) is disregarded, the amount of movement of the image side movable group becomes small, thus making it difficult to provide the retreat position of the reflective surface, or the moving distance of the object side movable group becomes too large, thus complicating the mechanical construction of the collapsing part.

It is further preferable that conditional formula (1a) below be satisfied:

$$|T1/T2|<1.5 \tag{1a}$$

This conditional formula (1a) defines, within the conditional range defined by the conditional formula (1), a conditional range further preferable out of the above-stated points and other considerations.

In the magnification variation from the wide-angle end to the telephoto end, it is preferable that conditional formula (2) below be satisfied:

$$0.1<L1/L2<0.9 \tag{2}$$

where

L1 represents the distance from the vertex of the most object side surface to the center of the reflective surface, and L2 represents the distance from the center of the reflective surface to the center of the image sensor.

The conditional formula (2) defines a favorable conditional range in regard to the position of the reflective surface. A larger distance behind the reflective surface can provide a favorable balance as a camera; therefore, it is preferable that the conditional formula (2) be satisfied. If the upper limit of the conditional formula (2) is disregarded, the lens front movement stroke in the photographing state becomes too large, thus complicating the mechanical construction. By contrast, if the lower limit of the conditional formula (2) is disregarded, contribution of the movable groups located closer to the object side than the reflective surface to magnification variation becomes too small (due to lack of space for their movement), thus resulting in a failure to provide a high optical performance.

It is further preferable that conditional formula (2a) below be satisfied:

$$0.2<L1/L2<0.78 \tag{2a}$$

This conditional formula (2a) defines, within the conditional range defined by the conditional formula (2), a conditional range further preferable out of the above-stated points and other considerations.

It is preferable that conditional formula (3) below be satisfied:

$$5<ft/fw \tag{3}$$

where fw represents the focal length of the entire variable magnification optical system at the wide-angle end, and ft represents the focal length of the entire variable magnification optical system at the telephoto end.

The conditional formula (3) defines a favorable conditional range in regard to the magnification variation ratio. Increasing the magnification variation ratio so as to satisfy the conditional formula (3) results in a larger moving distance of the movable group and also a larger full length of the variable magnification optical system, thus presenting more remarkable slimming-down and downsizing effect provided by the collapsible construction described above. A decrease in the magnification variation ratio below the lower limit of the conditional formula (3) results in a shorter full length of the variable magnification optical system and also a smaller amount of movement of the movable group, thus providing smaller downsizing effect in the application of the collapsible construction described above.

It is further preferable that conditional formula (3a) or (3b) below be satisfied:

$$6.8<ft/fw \tag{3a}$$

$$7<ft/fw \tag{3b}$$

The conditional formula (3a) defines, within the conditional range defined by the conditional formula (3), a conditional range further preferable out of the above-stated points and other considerations. The conditional formula (3b) defines, within the conditional range defined by the conditional formula (3a), a conditional range further preferable out of the above-stated points and other considerations.

It is preferable that the movable group at least part of which is stored into the space left after the movement of the reflective surface be located closer to the object side than the reflective surface and that conditional formula (4) below be satisfied:

$$2.5<D/h<7.3 \tag{4}$$

where

D represents the effective diameter of the most object side lens element, and h represents the maximum image height on the light receiving surface of the image sensor (that is, one half of a diagonal line of the screen of the image sensor).

In the transition from the photographing state to the non-photographing state, with the collapsible construction of the types (for example, FIGS. 19A to 19B through FIGS. 21A to 21B) with which at least part of the movable group located closer to the object side than the reflective surface is stored into the space left after the movement of the reflective surface, the effective diameter of the most object side lens element has a great influence on the collapsible construction. Conditional formula (4) defines a favorable conditional range in regard to the effective diameter of this lens element. If the upper limit of the conditional formula (4) is disregarded, the most object side lens group becomes too large, thus resulting in a failure to provide a space during collapsing. By contrast, if the lower limit of the conditional formula (4) is disregarded, the most object side lens group becomes too small, thus resulting in a failure to provide a favorable optical performance.

It is further preferable that conditional formula (4a) below be satisfied:

$$2.5 < D/h < 6.3 \tag{4a}$$

This conditional formula (4a) defines, within the conditional range defined by the conditional formula (4), a conditional range further preferable out of the above-stated points and other considerations.

It is preferable that the movable group at least part of which is stored into the space left after the movement of the reflective surface be located closer to the object side than the reflective surface and that conditional formula (5) below be satisfied:

$$0.35 < D/Tair < 1.00 \tag{5}$$

where

D represents the effective diameter of the most object side lens element, and

Tair represents the sum of variable air spacing located closer to the image side than the reflective surface.

In the transition from the photographing state to the non-photographing state, with the collapsible construction of the types (for example, FIGS. 19A to 19B through FIGS. 21A to 21B) with which at least part of the movable group located closer to the object side than the reflective surface is stored into the space left after the movement of the reflective surface, the variable air-spacing located closer to the image side than the reflective surface has a great influence on the collapsible construction. Conditional formula (5) defines a favorable conditional range in regard to the variable air-spacing. If the upper limit of the conditional formula (5) is disregarded, the variable air-spacing located closer to the image side than the reflective surface becomes too large, thus resulting in a larger camera size. By contrast, if the lower limit of the conditional formula (5) is disregarded, the space for permitting the reflective surface to move during non-photographing decreases, thus resulting in a failure to provide a sufficient space for storing the most object side lens group, that is, making it difficult to utilize the variable air-spacing located to the image side than the reflective surface as the space for permitting the reflective surface to move.

It is further preferable that conditional formula (5a) below be satisfied:

$$0.55 < D/Tair < 1.00 \tag{5a}$$

This conditional formula (5a) defines, within the conditional range defined by the conditional formula (5), a conditional range further preferable out of the above-stated points and other considerations.

As described above, with the construction with which at least part of the movable group is stored into the space left after the movement of the reflective surface in the transition from the photographing state to the non-photographing state, for example, as shown in FIGS. 19A, 19B, 20A, and 20B, it is preferable that the variable magnification optical system include: in order from the object side, a first lens group having a positive optical power; a second lens group having a negative optical power; and a third lens group having a positive or negative optical power, that the second lens group be a fixed group that is kept in fixed position during magnification variation, that at least the first lens group and the third lens group be movable groups, and that a reflective surface be located in the second lens group. With this construction, an angle of ray passing through the inside of the second lens group can be suppressed, which is favorable for arranging the reflective surface. Moreover, a favorable balance in the moving distance between the first lens group and the third lens group and also a favorable balance in the length between before and after bending can be provided, thus permitting effectively reducing the volume during the non-photographing. From the viewpoints of a higher performance and a higher variable magnification, it is further preferable that the variable magnification optical system be a zoom lens system composed of four lens groups including a positive, negative, positive, and positive lens groups.

As described above, with the construction with which at least part of the movable group is stored into the space left after the movement of the reflective surface in the transition from the photographing state to the non-photographing state, for example, as shown in FIGS. 21A and 21B, it is preferable that the variable magnification optical system include: in order from the object side, a first lens group having a positive optical power; a second lens group having a negative optical power; a reflective surface; and a third lens group having a positive or negative optical power, that the second lens group be a fixed group that is kept in fixed position during magnification variation, and that at least the first lens group and the third lens group be movable groups. The position between the second lens group and the third lens group is also a favorable place for arranging the reflective surface, considering an angle of ray. The absence of a reflective surface inside the lens groups provides an advantage in manufacturability. From the viewpoints of a higher performance and a higher variable magnification, it is further preferable that the variable magnification optical system be a zoom lens system composed of a four-group construction including a positive, negative, positive, and positive lens groups.

Next, a detailed description will be given on a zoom lens system ZL composing the image-taking lens unit LU. FIGS. 1A to 1B through 4A to 4B are lens construction diagrams respectively corresponding to zoom lens system ZL of the first to fourth embodiments. FIGS. 1A, 2A, 3A and 4A are lens arrangements at the wide-angle end, with the optical path expanded in optical cross section of the bending optical system. FIGS. 1B, 2B, 3B and 4B are lens arrangements at the telephoto end, with the optical path expanded in optical cross section of the bending optical system. FIGS. 5 to 8 are lens construction diagrams respectively corresponding to zoom lens system ZL of the first to fourth embodiments, each showing the lens arrangement at the wide-angle end W, with the optical path expanded in optical cross section of the bending optical system.

In FIGS. 5 to 8, the following conventions are used. A surface indicated by ri (i=1, 2, 3, . . .) is the i-th surface counted from the object side, and a surface whose symbol ri is marked with an asterisk (*) is an aspherical surface. An axial distance indicated by di (i=1, 2, 3, . . .) is the i-th axial distance counted from the object side, though only those axial distances which vary during zooming are shown here. In FIGS. 1A to 1B through 4A to 4B, and FIGS. 5 to 8, arrows m1, m2, m3, and m4 represent movement loci that schematically indicate the movement of the first to fourth lens units Gr1 to Gr4, respectively, (i.e., position change relative to the image surface IM) during zooming from the wide-angle end W to the telephoto end T. The arrow mR indicates that the prism PR or the mirror MR is kept in fixed position during zooming. The arrow mP indicates that the parallel-plane plate PT is kept in fixed position during zooming. In any of the embodiments, the third lens unit Gr3 has on the most object side the aperture stop ST, which serves as a component of the third lens unit Gr3 and moves (in the direction indicated by the arrow m3) during zooming.

The zoom lens systems ZL of each embodiment is composed of four lens groups: in order from the object side, a first lens group Gr1 having a positive optical power, a second lens group Gr2 having a negative optical power, a third lens group Gr3 having a positive optical power, and a fourth lens group Gr4 having a positive optical power, and achieves variable magnification by moving the first, third, and fourth lens groups Gr1, Gr3, and Gr4. During zooming from the wide-angle end W to the telephoto end T, the first and third lens units Gr1 and Gr3 move toward the object side in a substantially linear manner (i.e., monotonously), the second lens unit Gr2 is kept in fixed position, and the fourth lens unit Gr4 moves toward the object side and then moves from the object side back toward the image side. In the first embodiment, the prism PR for bending the optical axis AX is provided in the second lens group Gr2. In the second embodiment, the mirror MR for bending the optical axis AX is provided in second lens group Gr2. In the third embodiment, the prism PR for bending the optical axis AX is provided between the second and third lens groups Gr2 and Gr3. In the fourth embodiment, the mirror MR for bending the optical axis AX is provided between the second and third lens groups Gr2 and Gr3. Hereinafter, a detailed description will be given on the lens construction of each embodiment.

In the first embodiment (FIGS. 1A, 1B, and 5), in the four-group zoom construction composed of a positive, a negative, a positive, and a positive lens groups, each lens group is built as follows. The first lens unit Gr1 is composed of: in order from the object side, a negative meniscus lens element concave to the image side; and two positive meniscus lens elements convex to the object side. The second lens group Gr2 is composed of in order from the object side, a negative meniscus lens element concave to the image side (and having an aspherical surface on the image side); a prism PR; a biconcave negative lens element; and a biconvex positive lens element. The third lens group Gr3 is composed of in order from the object side, an aperture stop ST; a positive meniscus lens element convex to the object side (and having an aspherical surface on the object side); and a cemented lens element formed of a biconvex positive lens element and a biconcave negative lens element; a biconcave negative lens element (having an aspherical surface on the image side); and a positive meniscus lens element convex to the object side. The fourth lens group Gr4 is composed of: in order from the object side, a biconvex positive lens element (having aspherical surfaces on the both sides); and a negative meniscus lens element concave to the object side.

In the second embodiment (FIGS. 2A, 2B, and 6), in the four-group zoom construction composed of a positive, a negative, a positive, and a positive lens groups, each lens group is built as follows. The first lens group Gr1 is composed of in order from the object side, a negative meniscus lens element concave to the image side; and two positive meniscus lens elements convex to the object side. The second lens group Gr2 is composed of: in order from the object side, a biconcave negative lens element (having an aspherical surface on the image side); a mirror N; a biconcave negative lens element; a biconvex positive lens element; and a biconcave negative lens element. The third lens group Gr3 is composed of: in order from the object side, an aperture stop ST; a positive meniscus lens element convex to the object side (and having an aspherical surface on the object side); a cemented lens element formed of a biconvex positive lens element and a biconcave negative lens element; a biconcave negative lens element (having an aspherical surface on the image side); and a biconvex positive lens element. The fourth lens group Gr4 is composed of: in order from the object side, a biconvex positive lens element (having aspherical surfaces on the both sides); and a negative meniscus lens element concave to the object side.

In the third embodiment (FIGS. 3A, 3B, and 7), in the four-group zoom construction composed of a positive, a negative, a positive, and a positive lens groups, a prism PR is arranged between the second lens group Gr2 and the third lens group Gr3, and each lens group is built as follows. The first lens group Gr1 is composed of in order from the object side, a negative meniscus lens element concave to the image side; and two positive meniscus lens elements convex to the object side. The second lens group Gr2 is composed of in order from the object side, a negative meniscus lens element concave to the image side (and having an aspherical surface on the image side); a biconcave negative lens element; and a biconvex positive lens element. The third lens group Gr3 is composed of in order from the object side, an aperture stop ST; a positive meniscus lens element convex to the object side (and having an aspherical surface on the object side); a cemented lens element formed of a biconvex positive lens element and a negative meniscus lens element concave to the object side; a biconcave negative lens element (having an aspherical surface on the image side); and a biconvex positive lens element. The fourth lens group Gr4 is composed of in order from the object side, a biconvex positive lens element (having aspherical surfaces on the both sides); and a negative meniscus lens element concave to the object side.

In the fourth embodiment (FIGS. 4A, 4B, and 8), in the four-group zoom construction composed of a positive, a negative, a positive, and a positive lens groups, a mirror MR is arranged between the second lens group Gr2 and the third lens group Gr3, and each lens group is built as follows. The first lens group Gr1 is composed of: in order from the object side, a negative meniscus lens element concave to the image side; and two positive meniscus lens elements convex to the object side. The second lens group Gr2 is composed of: in order from the object side, a negative meniscus lens element concave to the image side (and having an aspherical surface on the image side); a biconcave negative lens element; and a biconvex positive lens element. The third lens group Gr3 is composed of: in order from the object side, an aperture stop ST; a positive meniscus lens element convex to the object side (and having an aspherical surface on the image side); a cemented lens element formed of a biconvex positive lens element and a negative meniscus lens element concave to the object side; a biconcave negative lens element; and a biconvex positive lens element (having an aspherical surface on the object side). The fourth lens group Gr4 is composed of: in order from the object side, a biconvex positive lens element (having an aspherical surface on the image side); and a negative meniscus lens element concave to the object side (and having an aspherical surface on the object side).

Figures 2A, 2B:
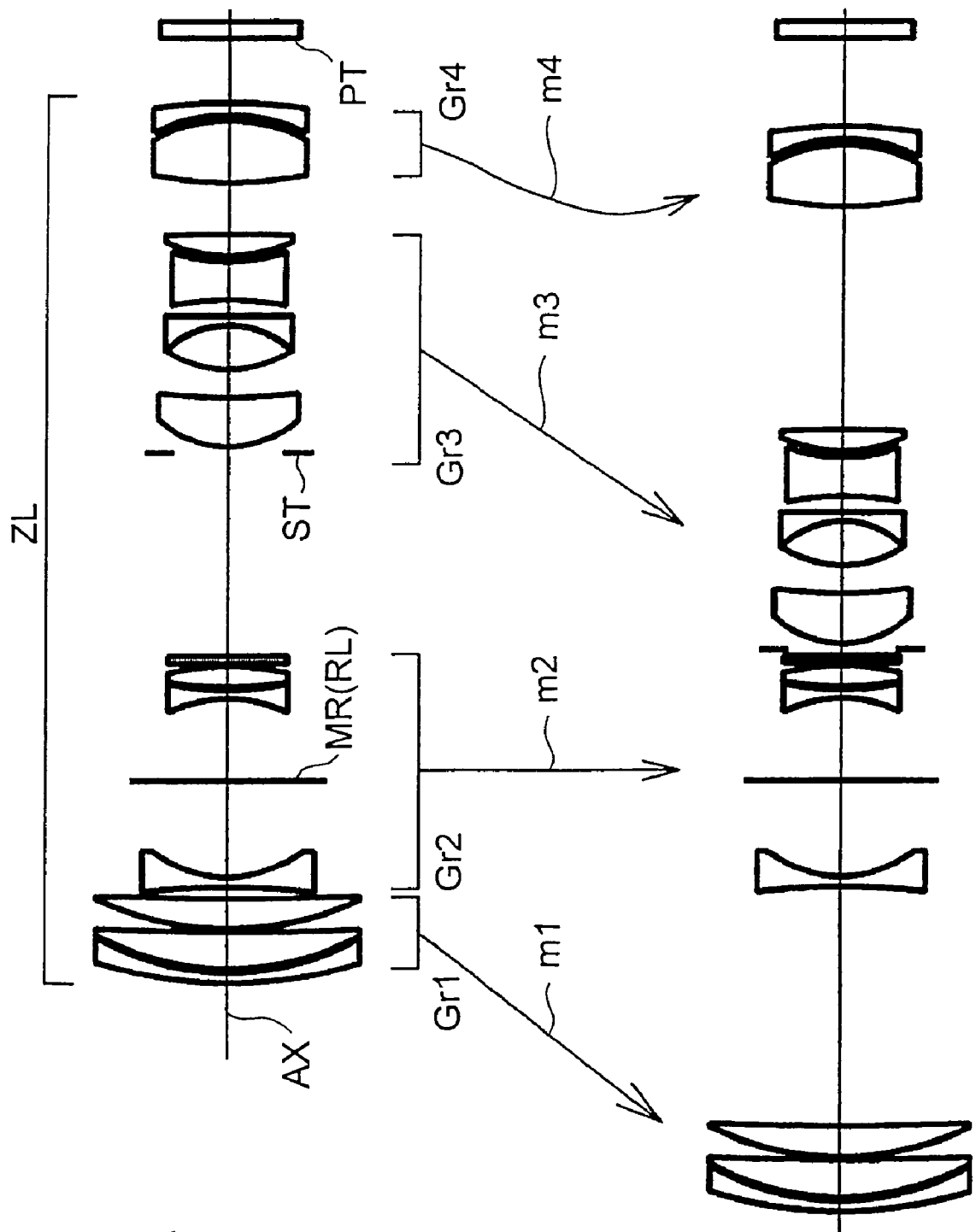
FIG. 2A and 2B are lens construction diagrams showing magnification variation construction with the optical path straightened according to a second embodiment (Example 2) of the invention.
Figures 3A, 3B:
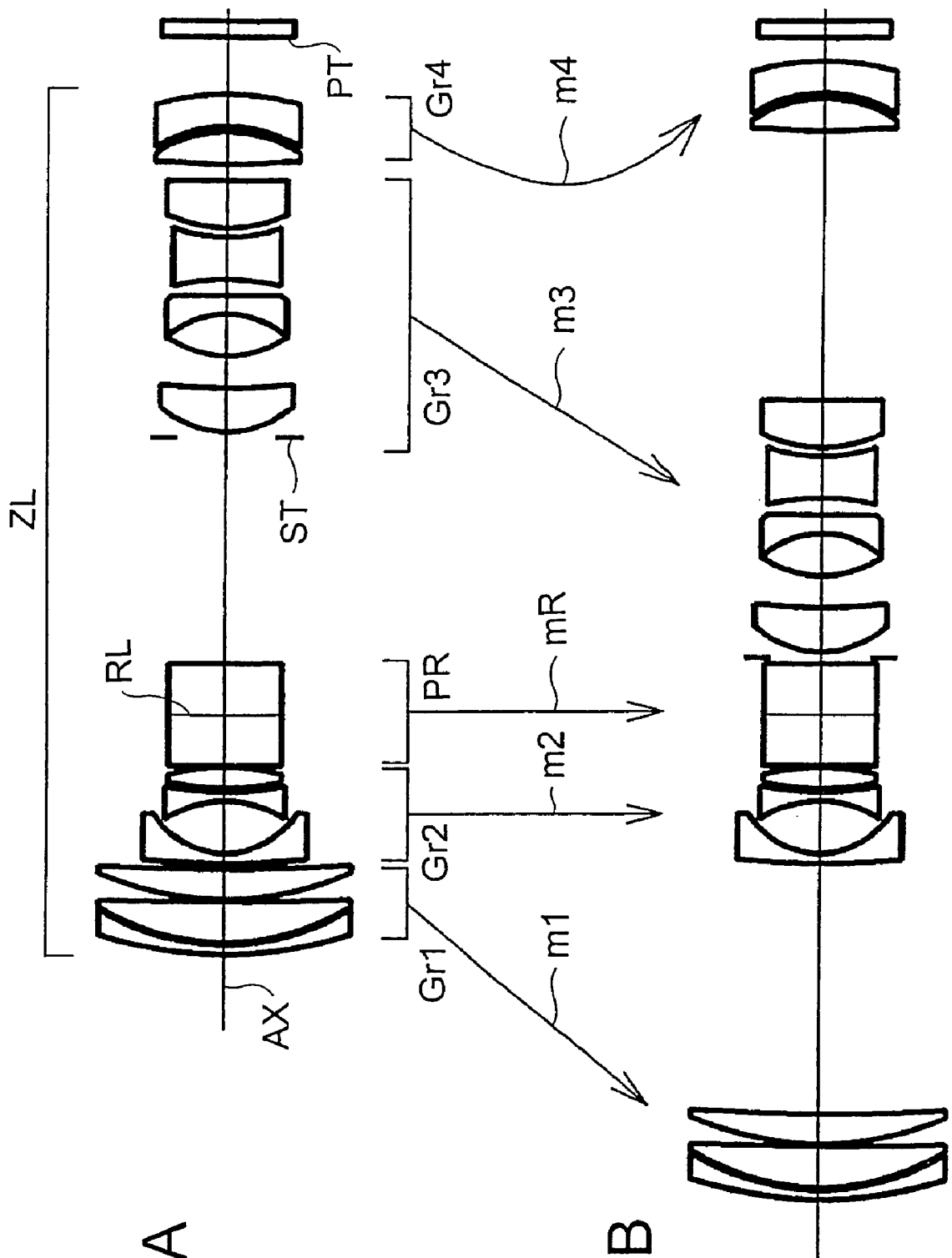
FIG. 3A to 3B are lens construction diagrams showing magnification variation construction with the optical path straightened according to a third embodiment (Example 3) of the invention.
Figures 4A, 4B:
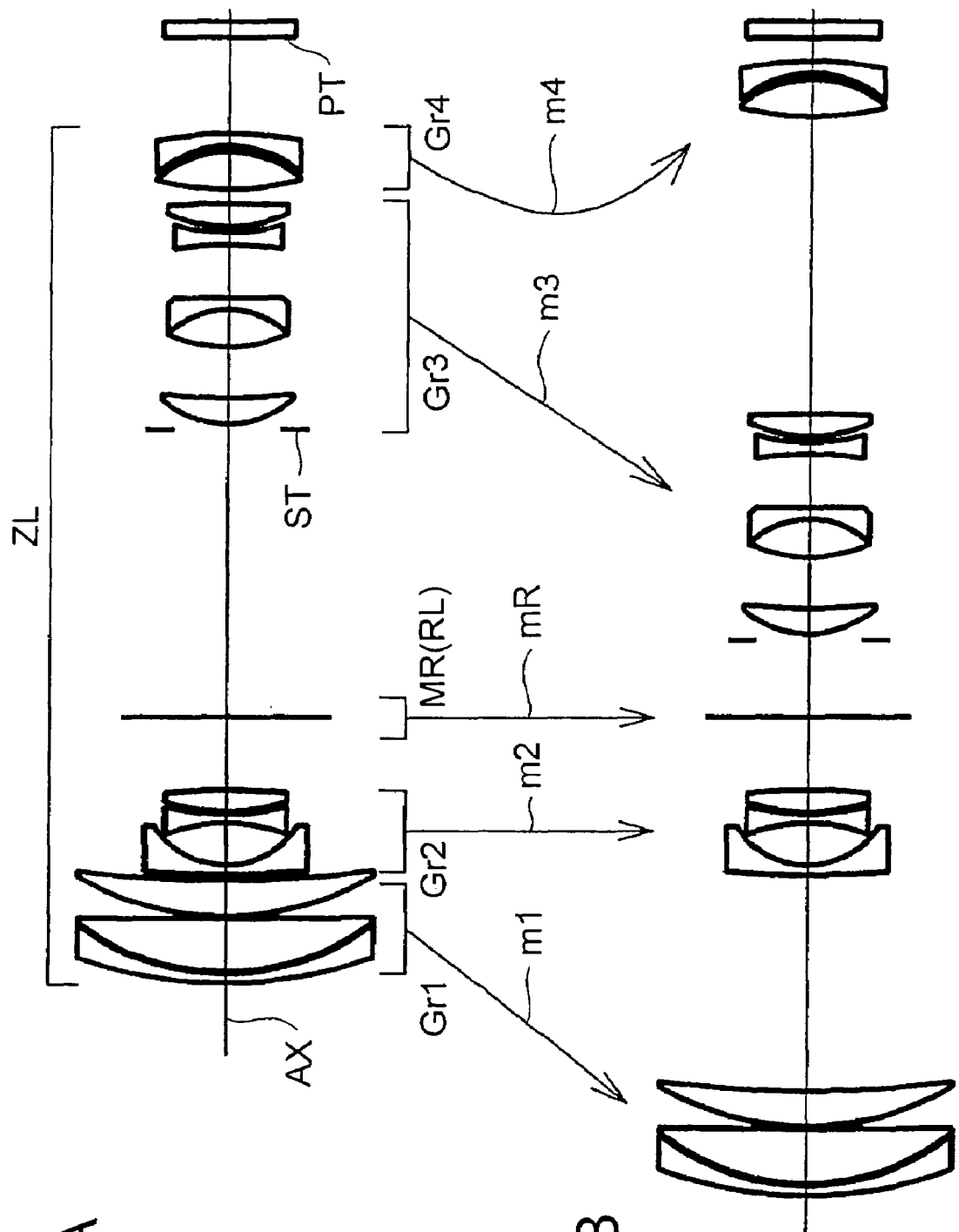
FIG. 4A and 4B are lens construction diagrams showing magnification variation construction with the optical path straightened according to a fourth embodiment (Example 4) of the invention.
Figure 5:
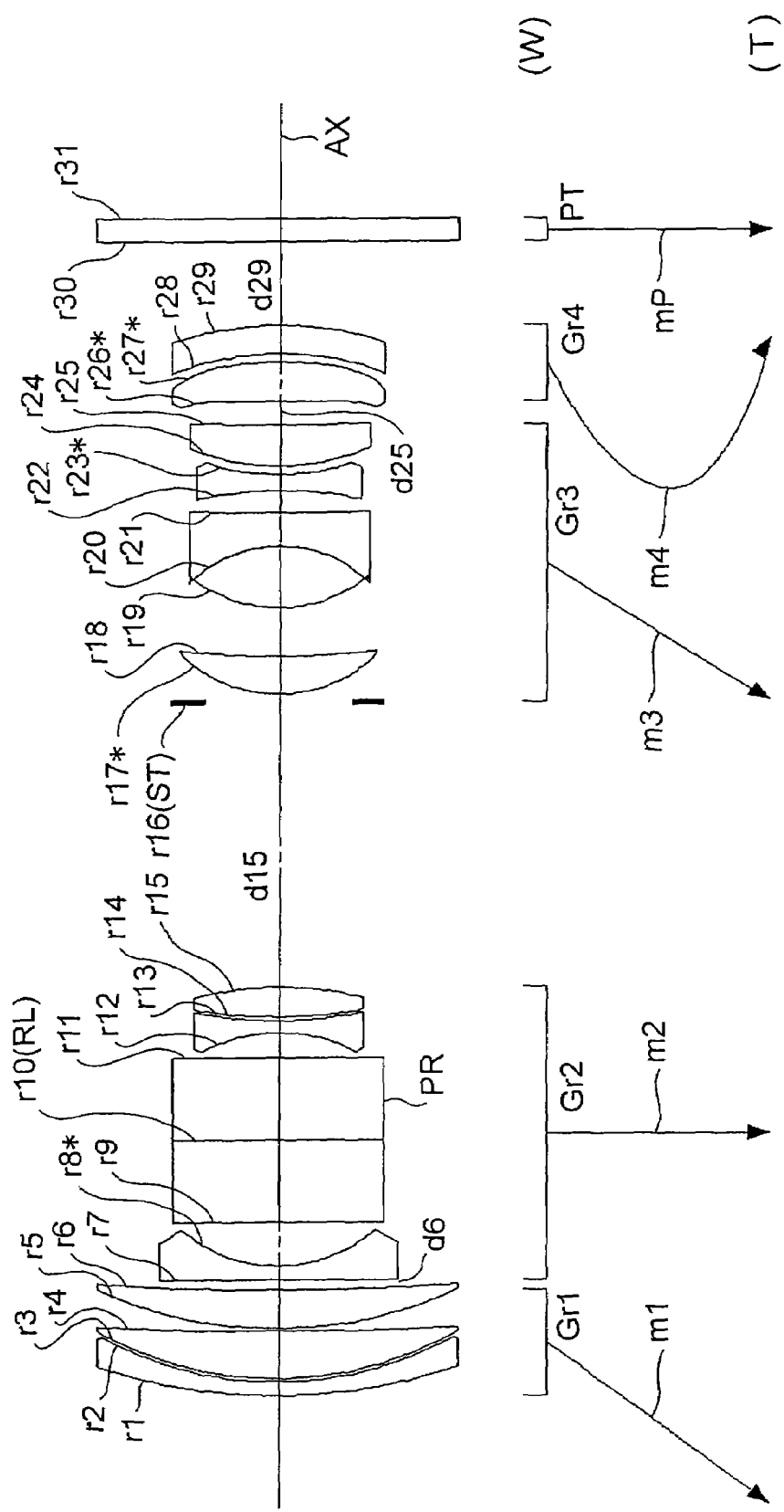
FIG. 5 is a lens construction diagram showing optical construction with the optical path straightened according to the first embodiment (Example 1) of the invention.
Figure 6:
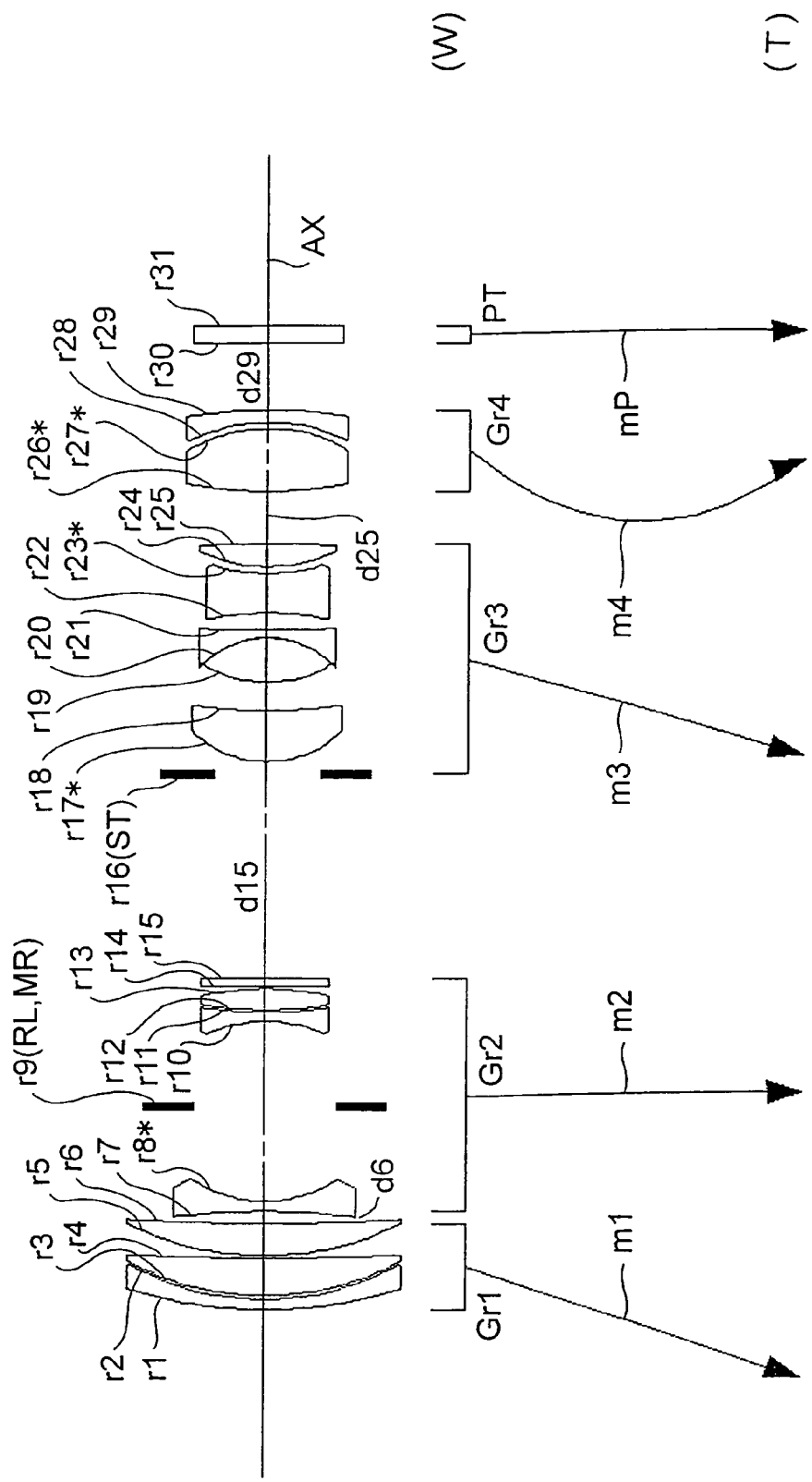
FIG. 6 is a lens construction diagram showing optical construction with the optical path straightened according to the second embodiment (Example 2) of the invention.
Figure 7:
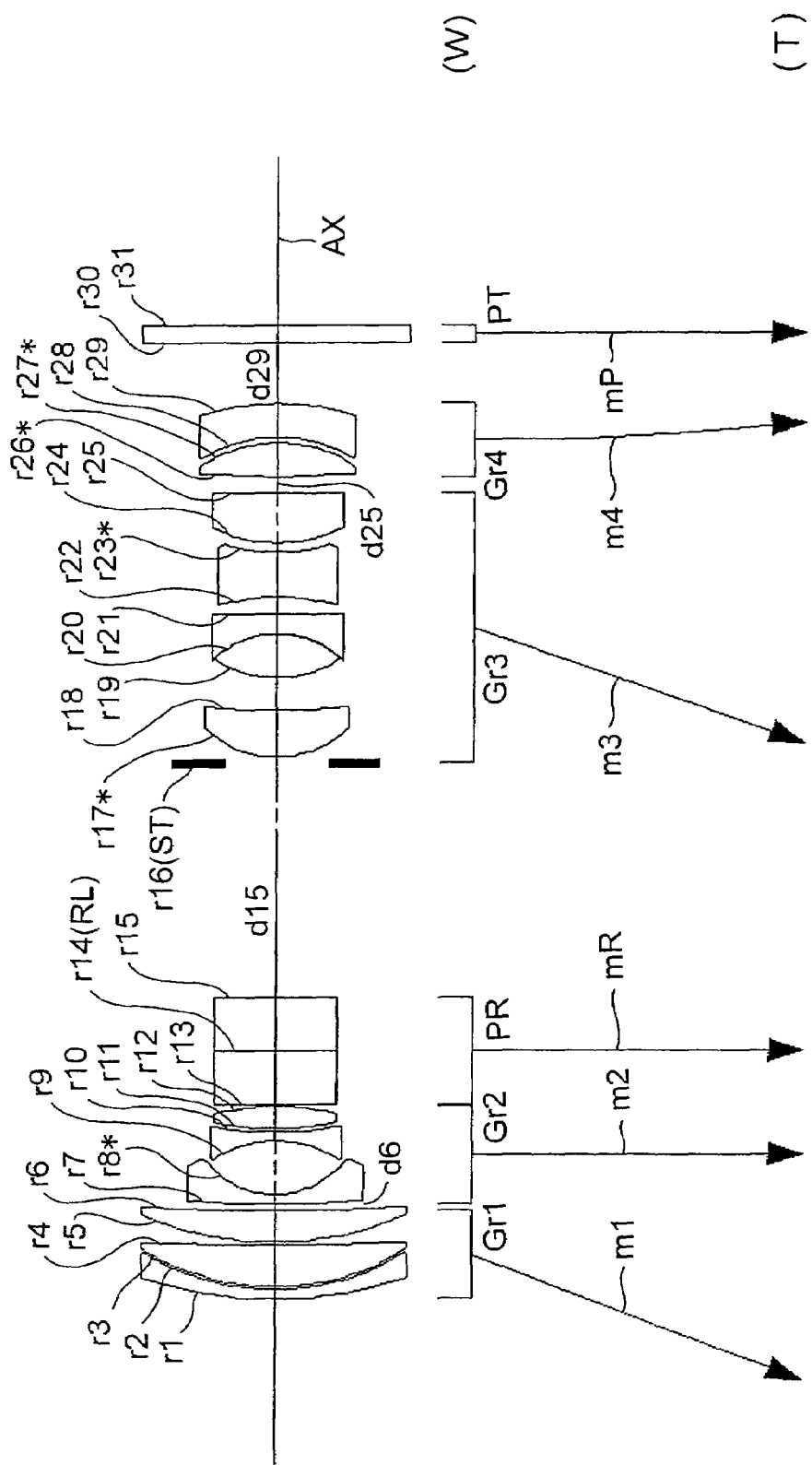
FIG. 7 is a lens construction diagram showing optical construction with the optical path straightened according to the third embodiment (Example 3) of the invention.
Figure 8:
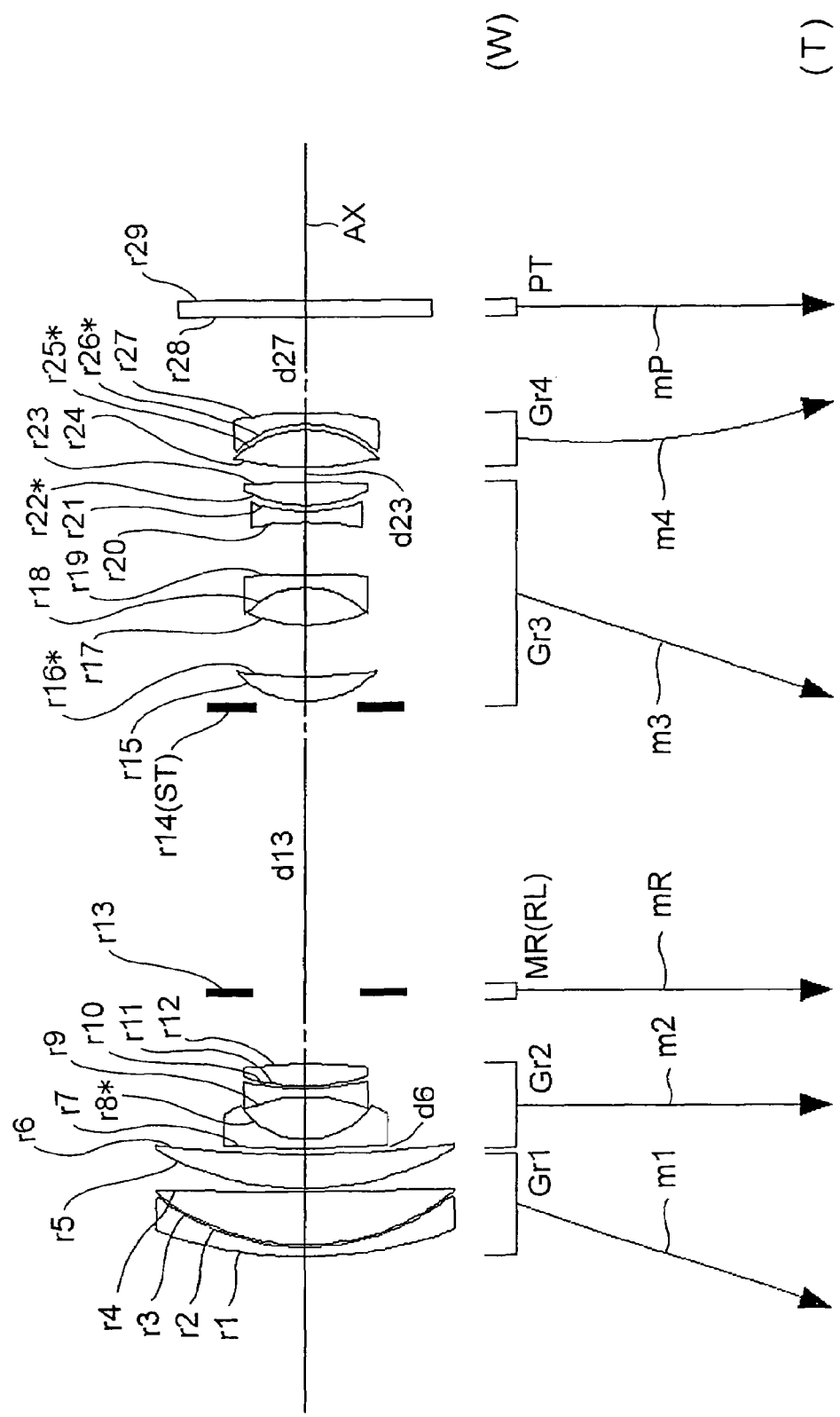
FIG. 8 is a lens construction diagram showing optical construction with the optical path straightened according to the fourth embodiment (Example 4) of the invention.
Figure 9A:
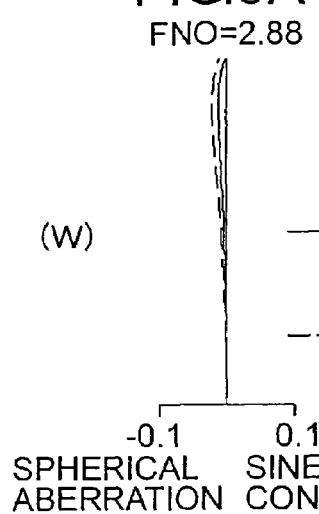
FIG. 9A to 9I are aberration diagrams of Example 1.
Figure 9B:
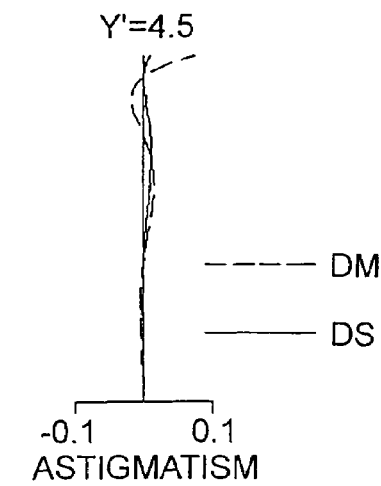
Figure 9C:
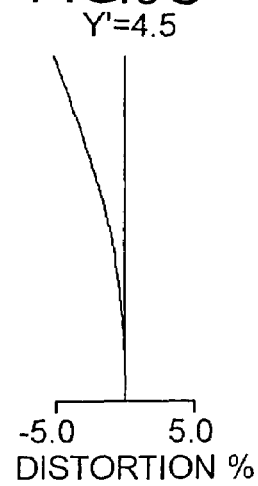
Figure 9D:
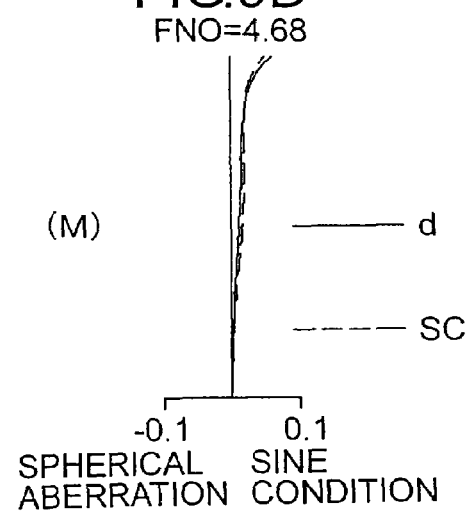
Figure 9E:
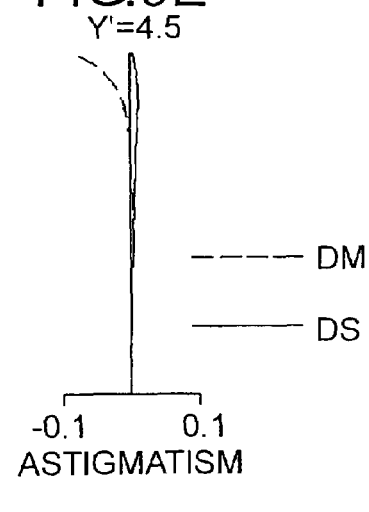
Figure 9F:
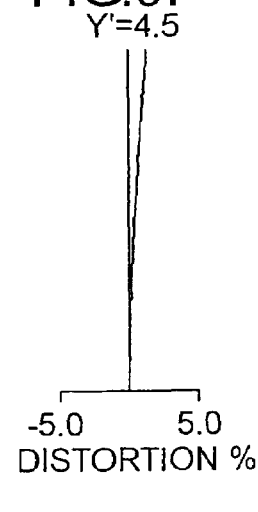
Figure 9G:
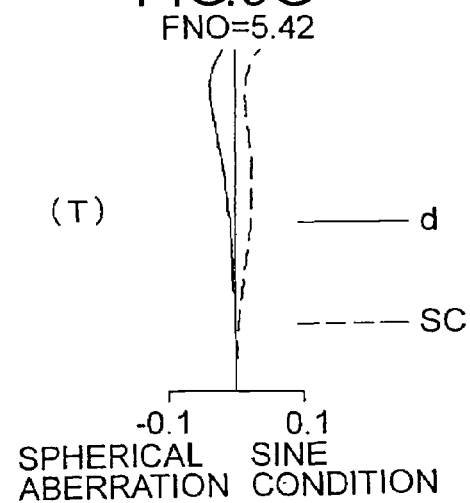
Figure 9H:
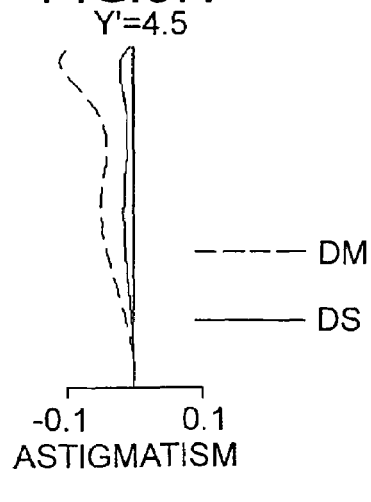
Figure 9I:
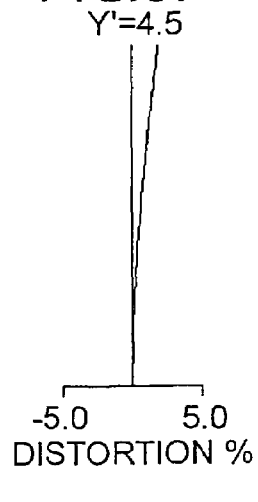
Figure 10A:
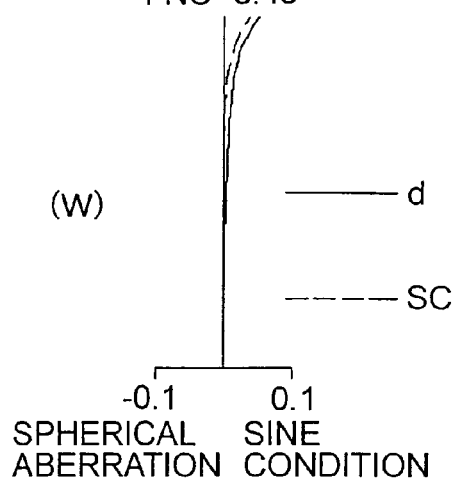
FIG. 10A to 10I are aberration diagrams of Example 2.
Figure 10B:
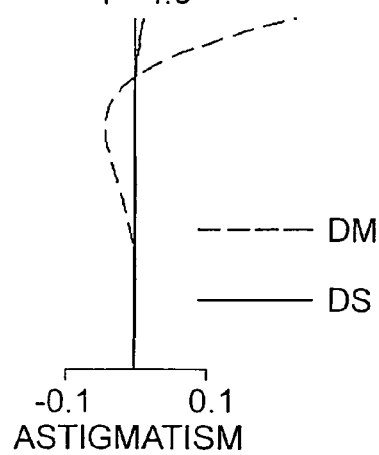
Figure 10C:
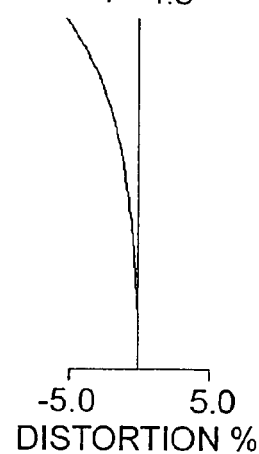
Figure 10D:
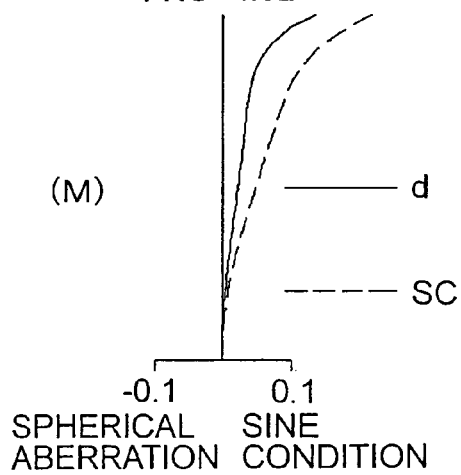
Figure 10E:
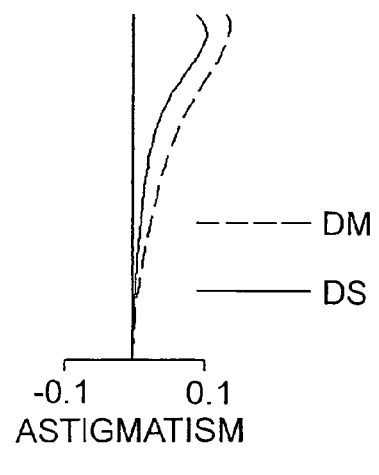
Figure 10F:
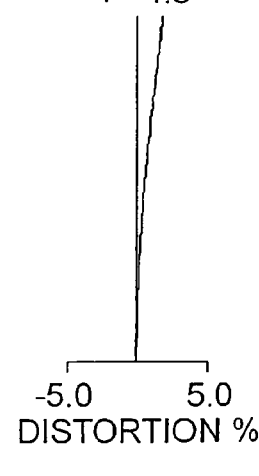
Figure 10G:
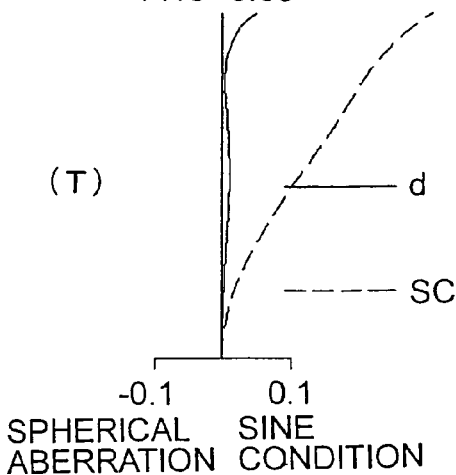
Figure 10H:
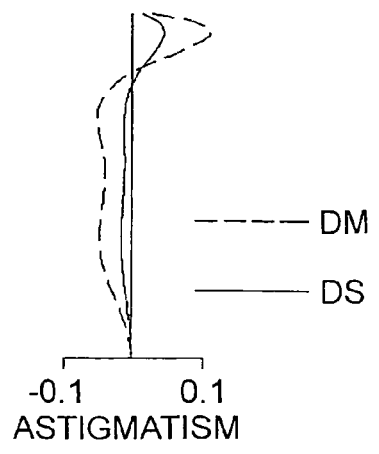
Figure 10I:
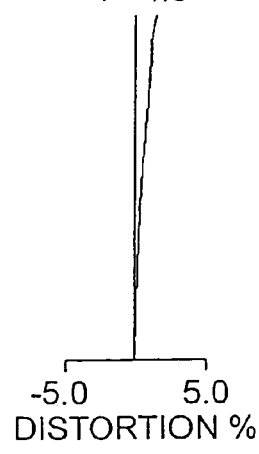
Figure 11A:
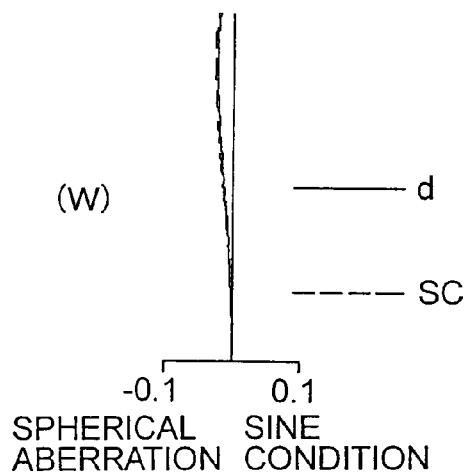
FIG. 11A to 11I are aberration diagrams of Example 3.
Figure 11B:
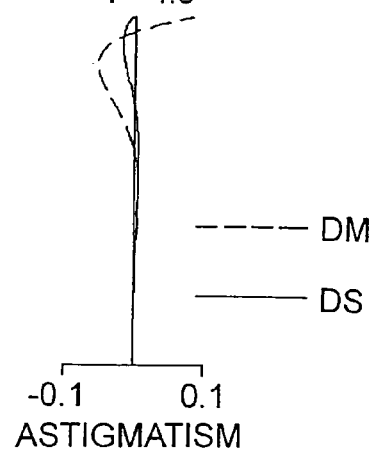
Figure 11C:
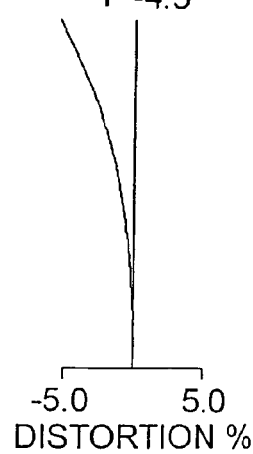
Figure 11D:
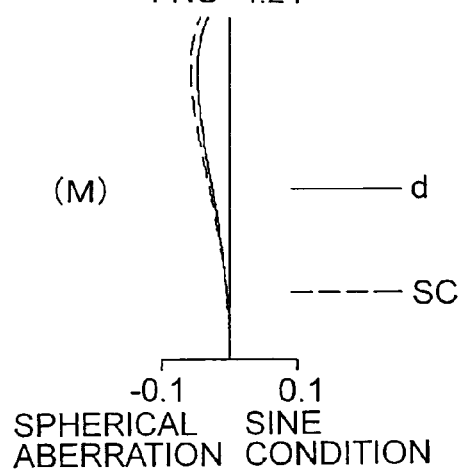
Figure 11E:
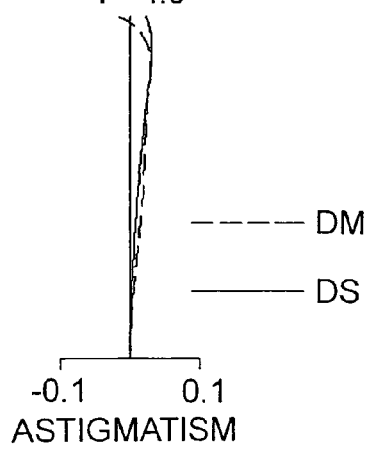
Figure 11F:
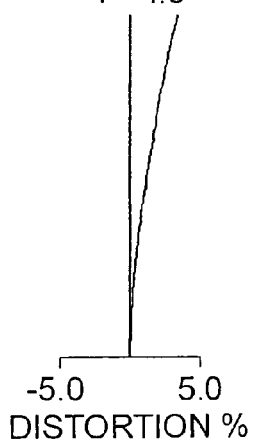
Figure 11G:
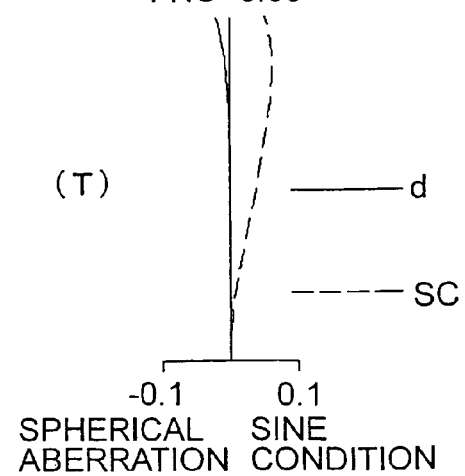
Figure 11H:
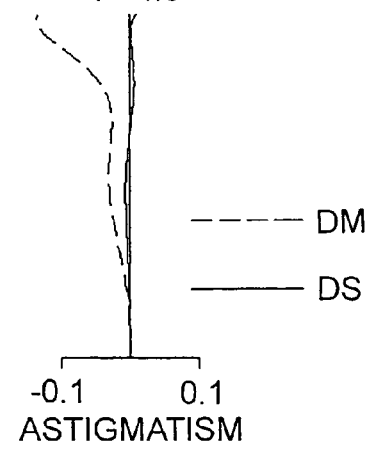
Figure 11I:
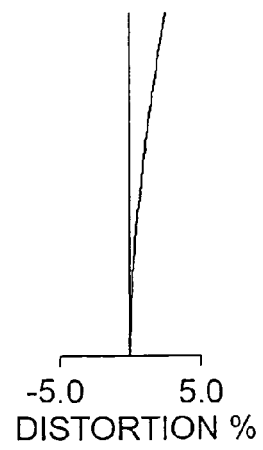
Figure 12A:
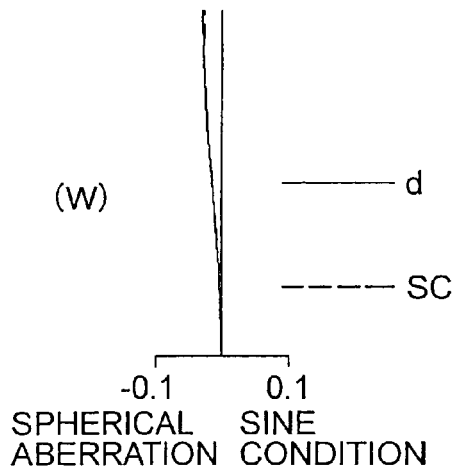
FIG. 12A to 12I are aberration diagrams of Example 4.
Figure 12B:
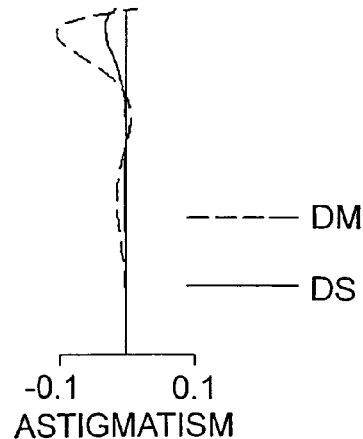
Figure 12C:
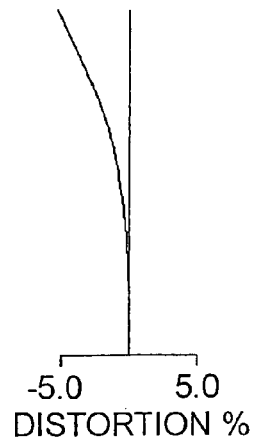
Figure 12D:
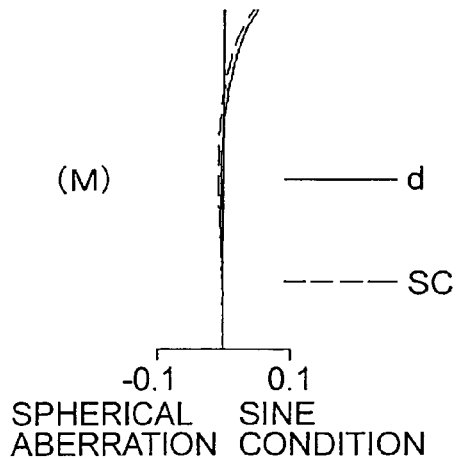
Figure 12E:
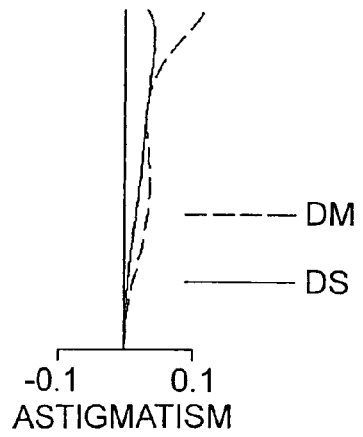
Figure 12F:
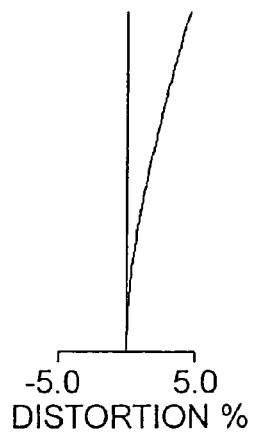
Figure 12G:
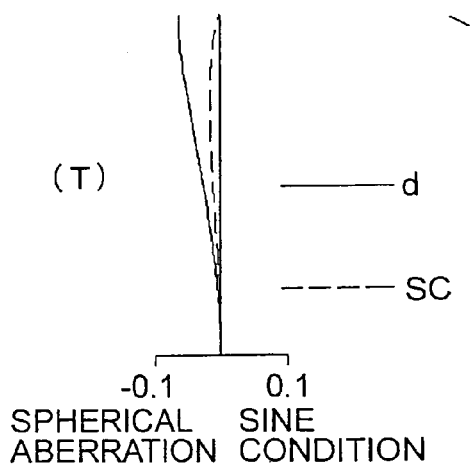
Figure 12H:
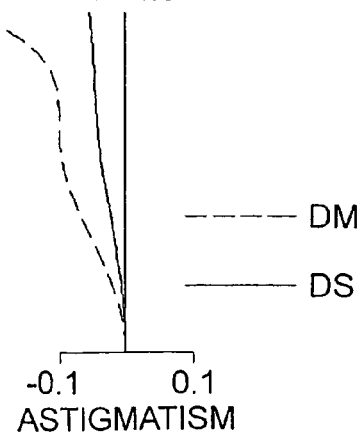
Figure 12I:
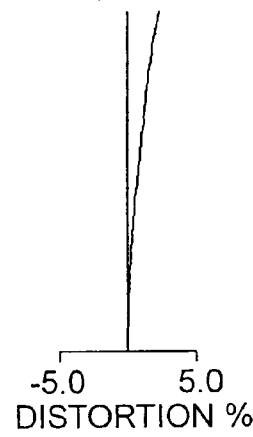
Figure 15A:
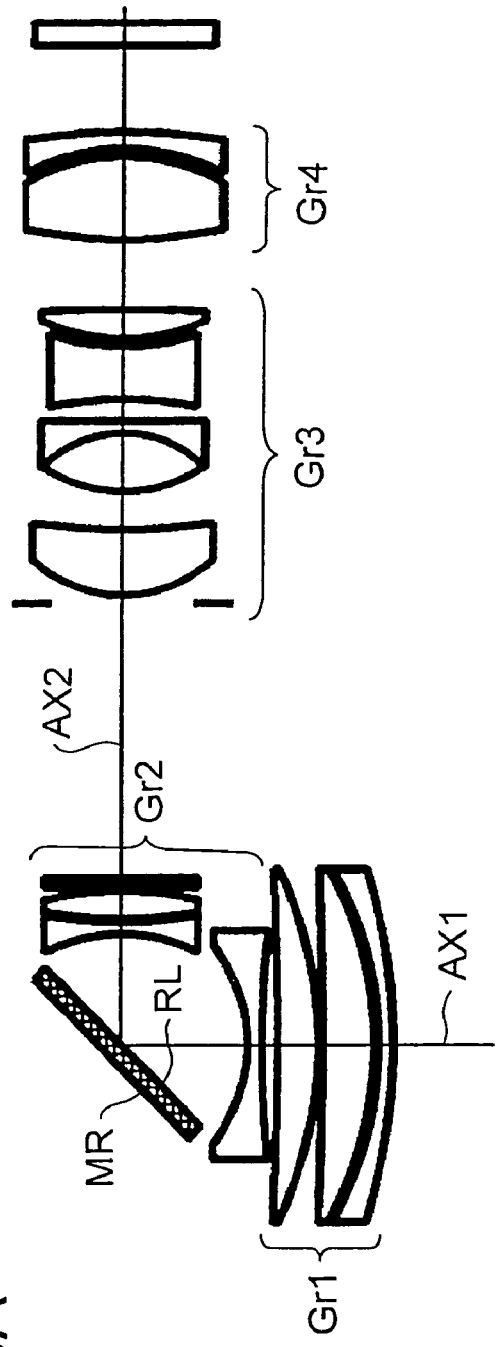
FIG. 15A and 15B are lens construction diagrams showing an example of first-type collapsible construction with the optical path bent according to the second embodiment (Example 2)
Figure 15B:
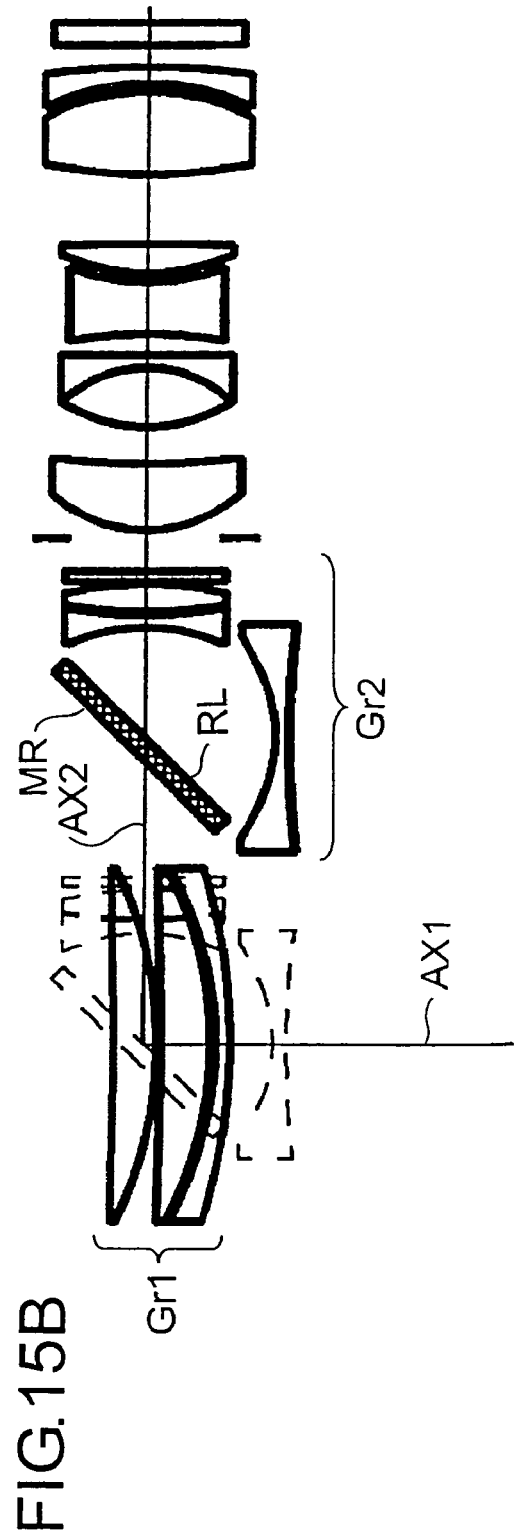
Figure 18A:
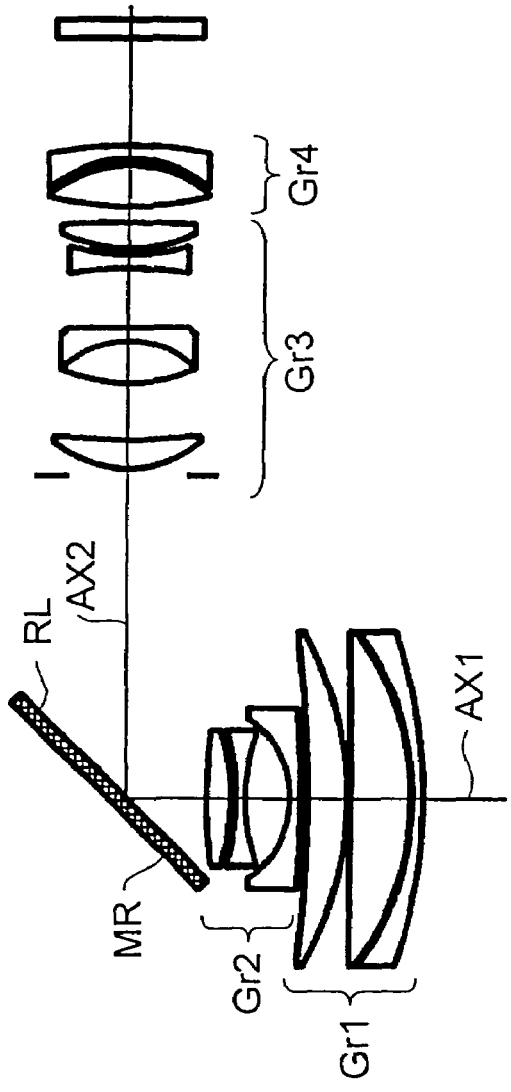
FIG. 18A and 18B are lens construction diagrams showing an example of third-type collapsible construction with the optical path bent according to the fourth embodiment (Example 4)
Figure 18B:
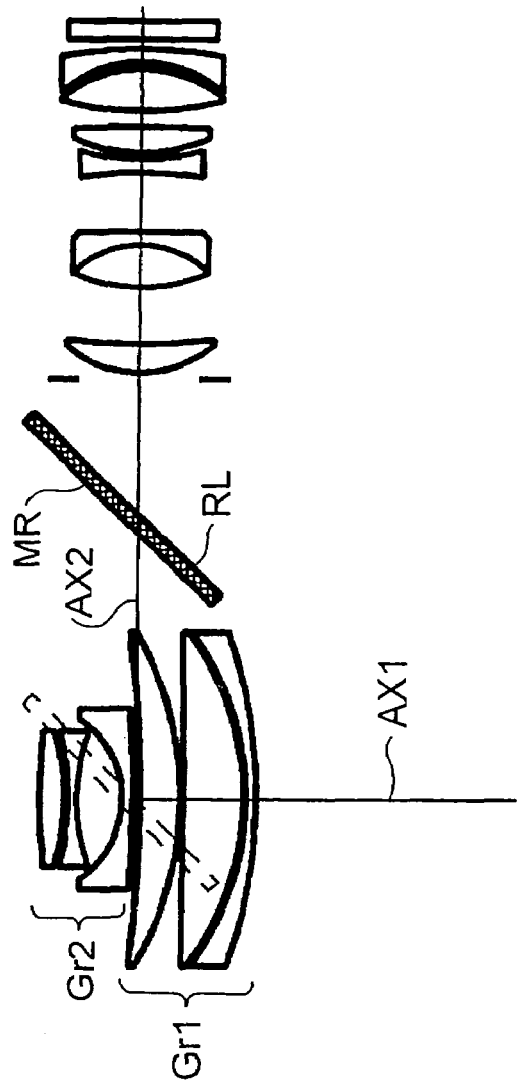

As described above, the types of parallel movement of the reflective surface along the optical axis located closer to the image side than the reflective surface in the transition from the photographing state to the non-photographing state includes: the first type in which the reflective surface moves together with the entire fixed group; the second type in which the reflective surface moves together with part of the fixed group; and the third type in which the reflective surface moves not with the lens group. FIGS. 13A to 13B through 18A to 18B show lens construction when the collapsible construction of the types described above are applied to the first to fourth embodiments, with the optical path bent in optical cross section. FIGS. 13A and 13B show the application of the first type to the first embodiment. FIGS. 14A and 14B show the application of the second type to the first embodiment. FIGS. 15A and 15B show the application of the first type to the second embodiment. FIGS. 16A and 16B show the application of the second type to the second embodiment. FIGS. 17A and 17B show the application of the third type to the third embodiment. FIGS. 18A and 18B show the application of the third type to the fourth embodiment. FIGS. 13A, 14A, 15A, 16A, 17A, and 18A show the photographing state at the wide-angle end W. FIGS. 13B, 14B, 15B, 16B, 17B, and 18B show the non-photographing state.

In the first and second embodiments (FIGS. 13A, 13B, 15A, and 15B) with the application of the first type, the reflective surface RL moves together with the entire second lens group Gr2. In the first embodiment (FIGS. 13A and 13B), the prism PR having the reflective surface RL is arranged between the lens elements composing the second lens group Gr2. In the second embodiment (FIGS. 15A and 15B), the mirror MR having the reflective surface RL is arranged between the lens elements composing the second lens group Gr2. In the transition from the photographing state to the non-photographing state, the prism PR or the mirror MR move together with the second lens group Gr2 toward the image side along the image side optical axis AX2, during which the third and fourth lens groups Gr3 and Gr4 also move toward the image side along the image side optical axis AX2 in order to provide the space for arranging the prism PR or the mirror MR and the second lens group Gr2. Then, the first lens group Gr1 moves toward the image side along the object side optical axis AX1 so as to be stored into the space left after the movement of the prism PR or the mirror MR and the second lens group Gr2.

In the first and second embodiments (FIGS. 14A, 14B, 16A, and 16B) with the application of the second type, the reflective surface RL moves together with part of the second lens group Gr2. In the first embodiment (FIGS. 14A and 14B), the prism PR having the reflective surface RL is arranged between the lens elements composing the second lens group Gr2. In the second embodiment (FIGS. 16A and 16B), the mirror MR having the reflective surface RL is arranged between the lens elements composing the second lens group Gr2. The second lens group Gr2 is composed of the object side portion Gr2a and the image side portion Gr2b with the prism PR or the mirror MR in between. In the transition from the photographing state to the non-photographing state, the prism PR or the mirror MR moves together with the image side portion Gr2b toward the image side along the image side optical axis AX2, during which, in the second embodiment, the third and fourth lens groups Gr3 and Gr4 also move toward the image side along the image side optical axis AX2 in order to provide the space for arranging the prism PR or the mirror MR and the image side portion Gr2b. In the first embodiment, the third and fourth lens groups Gr3 and Gr4 do not move since sufficient space is provided. Then, the first lens group Gr1 and the object side portion Gr2a move toward the image side along the object side optical axis AX1 so as to be stored into the space left after the movement of the prism PR or the mirror MR and the image side portion Gr2b. With the second type, since the reflective surface RL is located in the second lens group Gr2, the second lens group Gr2 is divided into the object side portion Gr2a and the image side portion Gr2b during collapsing, so that the image side portion Gr2b located after the reflective surface RL as viewed from the object side moves and retreats to the image side.

In the third and fourth embodiments (FIGS. 17A, 17B, 18A, and 18B) with the application of the third type, the reflective surface RL moves not with any of the lens groups.

In the third embodiment (FIGS. 17A and 17B), the prism PR having the reflective surface RL is arranged between the second lens group Gr2 and the third lens group Gr3. In the fourth embodiment (FIGS. 18A and 18B), the mirror MR having the reflective surface RL is arranged between the second lens group Gr2 and the third lens group Gr3. In the transition from the photographing state to the non-photographing state, the prism PR or the mirror MR move toward the image side along the image side optical axis AX2, during which, in the forth embodiment, the third and fourth lens groups Gr3 and Gr4 also move toward the image side along the image side optical axis AX2 in order to provide the space for arranging the prism PR or the mirror MR after its movement. In the third embodiment, the third and fourth lens groups Gr3 and Gr4 do not move since sufficient space is provided. Then, the first lens group Gr1 and the second lens group Gr2 move toward the image side along the object side optical axis AX1 so as to be stored into the space left after the movement of the prism PR or the mirror MR. In the third and fourth embodiments, the second lens group Gr2 is kept in fixed position during zooming. Both of the lens groups adjacently arranged in front of and behind the prism PR or the mirror MR may be movable groups. That is, with the third type, all the lens groups may be movable groups.

In the embodiments of any of the types, the first lens group Gr1 is stored into the space left by moving the prism PR, so that the space located closer to the image side than the prism PR is efficiently used during collapsing. As a result, the volume of the entire image-taking lens unit in non-photographing state decreases, thus permitting slimming-down of the camera. Since the prism PR has a large volume, a large space is provided after the movement of the prism PR. Therefore, the space inside the image-taking lens unit when not in use can be more efficiently utilized. The thickness of the first lens group Gr1 has a great influence on the thickness of the camera during non-photographing; therefore, storing the first lens group Gr1 in the space emptied after the movement of the prism PR is effective in the slimming-down of the camera.

In the embodiments of any of the types, the movable groups are provided on both the object side and the image side of the fixed group. This provides a favorable balance in the vertical and horizontal sizes of the camera and a favorable balance in the lens front movement stroke, thus effectively achieving the downsizing of the image-taking lens unit. In these embodiments, the movement direction of the prism PR differs from the movement direction of the first lens group Gr1 to be stored into the space emptied after the movement of the prism PR. This results in a smaller volume of the image-taking lens unit during non-photographing and, thus achieving slimming-down thereof.

In each of the embodiments, the zoom lens system ZL includes refractive lens elements, that is, lens elements that deflect rays incident thereon by refraction (that is, lens elements in which light is deflected at the interface between two media having different refractive indices). Any of those lens elements, however, may be replaced with a lens element of any other type, for example: a diffractive lens element, which deflects rays incident thereon by diffraction; a refractive-diffractive hybrid lens element, which deflects rays incident thereon by the combined effect of refraction and diffraction; or a gradient index lens element, which deflects the rays incident thereon with a refractive index distribution within a medium. A gradient index lens element, however, requires that its refractive index be varied within a medium and thus requires a complicated production process. Thus, using a gradient index lens element leads to higher cost. To avoid this, it is preferable to use lens elements made of a material having a uniform refractive index distribution. The zoom lens system ZL in each of the embodiments includes, other than lens elements, the aperture stop ST as an optical element, and may further include, as necessary, a beam restricting plate (for example, a flair cutter) or the like for cutting unnecessary light.

According to the present invention, in the transition from the photographing state to the non-photographing state, at least the reflective surface moves so that at least part of the movable group is stored into the space left after the movement of reflective surface. This structure permits reducing the volume during non-photographing with a bending optical system that is effective for slimming-down, thus permitting achieving downsizing and a higher variable magnification of the image-taking lens unit. The use of this image-taking lens unit in an image-taking apparatus such as a digital camera, a personal digital assistant, or the like, can contribute to the slimming-down, weight saving, downsizing, cost reduction, performance enhancement, function enhancement, and the like of such an apparatus.

EXAMPLES

Hereinafter, the optical construction and the like of the image-taking lens unit embodying the present invention will be described in detail, with reference to their construction data and other data. Examples 1 to 4 presented below are numerical examples corresponding respectively to the first to fourth embodiments described above. Thus, the lens construction diagrams (FIGS. 1A to 1B through 4A to 4B, FIGS. 5 to 8, FIGS. 13A to 13B through 18A to 18B) showing the first to fourth embodiments also show the lens constructions of Examples 1 to 4, respectively.

Tables 1 to 8 show the construction data of Examples 1 to 4. In the basic optical construction shown in Tables 1, 3, 5, and 7 (where i represents the surface number), ri (i=1, 2, 3, . . .) represents the radius of curvature (in mm) of the i-th surface counted from the object side; di (i=1, 2, 3, . . .) represents the axial distance (in mm) between the i-th and (i+1)th surfaces counted from the object side; Ni (i=1, 2, 3, . . .) and vi (i=1, 2, 3, . . .) represent the refractive index (Nd) for the d-line and the Abbe number (vd), respectively, of the optical material that fills the axial distance di. The axial distances di that vary with zooming are variable air spacing observed at the wide-angle end (at the shortest-focal-length position) W, at the middle position (at the middle-focal-length position) M, and at the telephoto end (at the longest-focal-length position) T, respectively. Shown together are the values of the focal length f (in mm) and f-number FNO of the entire system as observed at the just mentioned different focal-length positions W, M, and T.

A surface whose radius of curvature ri is marked with an asterisk (*) is an aspherical surface (a refractive optical surface having an aspherical shape, or a surface that exerts a refractive effect equivalent to that exerted by an aspherical surface, or the like). The surface shape of an aspherical surface is defined by formula (AS) below. Tables 2, 4, 6, and 8 show the aspherical surface data in Examples 1 to 5. Here, it should be noted that the coefficient of any term that does not appear in the tables equals zero, and that, for all the data, E−n stands for "×10$^{-n}$".

$$X(H) = (C0 \cdot H^2)/(1 + \sqrt{1 - \epsilon \cdot C0^2 \cdot H^2}) + \Sigma(Aj \cdot H^j) \quad (AS)$$

where

X(H) represents the displacement in the direction of the optical axis AX at the height H (relative to the vertex);

H represents the height in a direction perpendicular to the optical axis AX;

C0 represents the paraxial curvature (=1/ri);

$\epsilon$ represents the quadric surface parameter; and

Aj represents the aspherical surface coefficient of the j-th order.

Table 9 shows the values corresponding to the conditional formulae and relevant data as actually observed in each example. Note that, in the conditional formula (2), the distance L1 changes in accordance with the focal length position and thus the data for this distance is indicated for the distance the wide-angle end and the telephoto end, respectively. That is, L1w represents the distance from the vertex of the most object side surface to the center of the reflective surface at the wide-angle end. L1t represents the distance from the vertex of the most object side surface to the center of the reflective surface at the telephoto end.

FIGS. 9A to 9I through FIGS. 12A to 12I are aberration diagrams of Examples 1 through 4, respectively, when focused at infinity. Of these aberration diagrams, those with numbers suffixed with A, B, or C show the aberrations observed at (W) representing the wide-angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration and the like, those with numbers suffixed with B, E, or H show astigmatism, and those with numbers suffixed with C, F, or I show distortion. FNO represents the F number, and Y' (in mm) represents the maximum image height (corresponding to the distance from the optical axis AX) on the light-receiving surface SS of the image sensor SR. In each of the spherical aberration diagrams, the solid line d represents the spherical aberration (in mm) observed for the d-line, and the broken line SC represents the deviation (in mm) from the sine condition to be fulfilled. In each of the astigmatism diagrams, the broken line DM and the solid line DS represent the astigmatism (in mm) observed for the d-line on the meridional and sagittal planes, respectively. In each of the distortion diagrams, the solid line represents the distortion (in %) observed for the d-line.

TABLE 1

| Example 1 | Position f[mm] FNO | (W)~(M)~(T) 7.08~35.38~70.69 2.88~4.68~5.42 | | | |
|---|---|---|---|---|---|
| i | ri[mm] | di[mm] | Ni | vi | Component |
| 1 | 34.778 | 0.800 | 1.84719 | 23.97 | Gr1(+) |
| 2 | 21.726 | 0.200 | | | |
| 3 | 21.688 | 2.818 | 1.48750 | 70.44 | |
| 4 | 203.496 | 0.200 | | | |
| 5 | 26.151 | 2.257 | 1.67357 | 48.64 | |
| 6 | 153.926 | 0.615~13.418~19.757 | | | |
| 7 | 1473.057 | 0.800 | 1.87514 | 35.49 | Gr2(−) |
| 8 | 8.012 * | 2.526 | | | |
| 9 | ∞ | 4.900 | 1.84666 | 23.82 | PR |
| 10 | ∞ | 4.900 | 1.84666 | 23.82 | |
| 11 | ∞ | 1.491 | | | |
| 12 | −9.445 | 0.700 | 1.67291 | 48.68 | |
| 13 | 24.074 | 0.231 | | | |
| 14 | 26.688 | 1.755 | 1.84666 | 23.78 | |
| 15 | −19.389 | 16.991~1.382~0.500 | | | |
| 16 | ∞ | 0.500 | | | ST |
| 17 | 7.811 * | 2.308 | 1.55338 | 43.56 | Gr3(+) |
| 18 | 52.129 | 2.866 | | | |
| 19 | 7.995 | 3.633 | 1.49700 | 81.61 | |
| 20 | −7.376 | 1.963 | 1.84666 | 23.78 | |

TABLE 1-continued

| | | | | | |
|---|---|---|---|---|---|
| 21 | 164.483 | | 1.333 | | |
| 22 | −21.475 | | 1.000 | 1.88300 | 40.80 |
| 23 | 17.966 | * | 0.500 | | |
| 24 | 13.097 | | 2.445 | 1.71252 | 26.81 |
| 25 | 226.395 | | 1.335~2.118~20.788 | | |
| 26 | 88.719 | * | 2.318 | 1.53048 | 55.72 | Gr4(+) |
| 27 | −24.390 | * | 0.500 | | |
| 28 | −17.028 | | 1.649 | 1.84666 | 23.82 |
| 29 | −19.743 | | 4.960~19.788~2.000 | | |
| 30 | ∞ | | 1.357 | 1.51680 | 64.20 | PT |
| 31 | ∞ | | 1.000 | | |

TABLE 2

| Example 1 | Aspherical Surface Data of Surface i (*) | | |
|---|---|---|---|
| | Surface 8 | Surface 17 | Surface 23 |
| $\epsilon$ | 1.0000 | 1.0000 | 1.0000 |
| A4 | −0.14159500E−3 | −0.35159000E−4 | 0.68128100E−3 |
| A6 | −0.63706500E−6 | 0.12979300E−6 | 0.37572300E−5 |
| A8 | −0.54833300E−7 | | 0.38931000E−7 |
| | Surface 26 | Surface 27 | |
| $\epsilon$ | 1.0000 | 1.0000 | |
| A4 | −0.22428800E−3 | −0.24217900E−3 | |
| A6 | −0.85040400E−5 | −0.91127500E−5 | |
| A8 | | 0.46927200E−7 | |

TABLE 3

| Example 2 | Position f[mm] FNO | (W)~(M)~(T) 7.41~36.97~73.93 3.43~4.92~5.35 | | | |
|---|---|---|---|---|---|
| i | ri[mm] | di[mm] | Ni | vi | Component |
| 1 | 35.516 | 0.800 | 1.84666 | 23.82 | Gr1(+) |
| 2 | 21.158 | 0.307 | | | |
| 3 | 21.887 | 2.986 | 1.48750 | 70.44 | |
| 4 | 244.645 | 0.200 | | | |
| 5 | 24.403 | 2.456 | 1.70724 | 46.83 | |
| 6 | 200.353 | 0.921~14.676~19.187 | | | |
| 7 | −61.699 | 0.800 | 1.87957 | 38.32 | Gr2(−) |
| 8 | 8.735 * | 7.622 | | | |
| 9 | ∞ | 6.618 | | | MR |
| 10 | −10.602 | 0.700 | 1.70144 | 47.12 | |
| 11 | 25.765 | 0.231 | | | |
| 12 | 28.977 | 1.658 | 1.84666 | 23.78 | |
| 13 | −20.746 | 0.200 | | | |
| 14 | −4476.075 | 0.600 | 1.87270 | 34.13 | |
| 15 | 11210.762 | 16.357~3.005~0.500 | | | |
| 16 | ∞ | 0.500 | | | ST |
| 17 | 7.985 * | 4.000 | 1.56625 | 40.95 | Gr3(+) |
| 18 | 41.008 | 2.257 | | | |
| 19 | 9.071 | 3.540 | 1.49700 | 81.61 | |
| 20 | −6.982 | 0.710 | 1.84666 | 23.78 | |
| 21 | 381.520 | 1.307 | | | |
| 22 | −23.246 | 3.141 | 1.88300 | 40.80 | |
| 23 | 17.164 * | 0.500 | | | |
| 24 | 11.797 | 1.738 | 1.59701 | 36.17 | |
| 25 | −142.881 | 4.196~5.484~18.100 | | | |
| 26 | 26.735 * | 5.000 | 1.53048 | 55.72 | Gr4(+) |
| 27 | −12.686 * | 0.500 | | | |
| 28 | −13.062 | 1.000 | 1.88300 | 40.80 | |
| 29 | −37.955 | 5.219~17.285~7.173 | | | |
| 30 | ∞ | 1.357 | 1.51680 | 64.20 | PT |
| 31 | ∞ | 1.000 | | | |

TABLE 4

| Example 2 | Aspherical Surface Data of Surface i (*) | | |
|---|---|---|---|
| | Surface 8 | Surface 17 | Surface 23 |
| $\epsilon$ | 1.0000 | 1.0000 | 1.0000 |
| A4 | −0.18539100E−3 | −0.33897000E−4 | 0.47622100E−3 |
| A6 | −0.24308300E−5 | −0.26318100E−7 | 0.12639800E−5 |
| A8 | −0.79461200E−8 | | 0.38931000E−7 |
| | Surface 26 | Surface 27 | |
| $\epsilon$ | 1.0000 | 1.0000 | |
| A4 | 0.13736900E−4 | 0.22635400E−5 | |
| A6 | −0.21798300E−5 | −0.35579000E−5 | |
| A8 | | 0.40038200E−7 | |

TABLE 5

| Example 3 | Position f[mm] FNO | (W)~(M)~(T) 6.96~17.39~69.46 3.15~4.22~5.40 | | | |
|---|---|---|---|---|---|
| i | ri[mm] | di[mm] | Ni | vi | Component |
| 1 | 33.899 | 0.800 | 1.85186 | 25.38 | Gr1(+) |
| 2 | 20.261 | 0.200 | | | |
| 3 | 20.032 | 3.366 | 1.48814 | 70.76 | |
| 4 | 309.749 | 0.200 | | | |
| 5 | 27.184 | 2.413 | 1.67536 | 48.54 | |
| 6 | 163.505 | 0.500~8.317~20.500 | | | |
| 7 | 71.444 | 0.800 | 1.88300 | 40.80 | Gr2(−) |
| 8 | 6.787 * | 4.320 | | | |
| 9 | −9.209 | 0.700 | 1.71589 | 46.42 | |
| 10 | 27.210 | 0.327 | | | |
| 11 | 24.549 | 1.771 | 1.82631 | 24.06 | |
| 12 | −18.473 | 0.100 | | | |
| 13 | ∞ | 4.250 | 1.84666 | 23.78 | PR |
| 14 | ∞ | 4.250 | 1.84666 | 23.78 | |
| 15 | ∞ | 18.910~8.997~0.500 | | | |
| 16 | ∞ | 0.500 | | | ST |
| 17 | 8.158 * | 3.667 | 1.54801 | 44.78 | Gr3(+) |
| 18 | 47.265 | 2.653 | | | |
| 19 | 8.903 | 3.561 | 1.48750 | 70.44 | |
| 20 | −7.424 | 1.548 | 1.84666 | 23.82 | |
| 21 | −3644.580 | 1.387 | | | |
| 22 | −18.273 | 3.564 | 1.86658 | 41.20 | |
| 23 | 18.035 * | 0.732 | | | |
| 24 | 11.675 | 4.000 | 1.79183 | 24.51 | |
| 25 | −468.946 | 1.317~11.825~22.537 | | | |
| 26 | 42.384 * | 2.698 | 1.48750 | 70.00 | Gr4(+) |
| 27 | −11.471 * | 0.470 | | | |
| 28 | −11.287 | 2.682 | 1.85839 | 27.63 | |
| 29 | −20.905 | 4.809~4.215~2.000 | | | |
| 30 | ∞ | 1.357 | 1.51600 | 64.20 | PT |
| 31 | ∞ | 1.000 | | | |

TABLE 6

| Example 3 | Aspherical Surface Data of Surface i (*) | | |
|---|---|---|---|
| | Surface 8 | Surface 17 | Surface 23 |
| $\epsilon$ | 1.0000 | 1.0000 | 1.0000 |
| A4 | −0.14914600E−3 | −0.31500000E−4 | 0.44678500E−3 |
| A6 | −0.88798900E−6 | −0.45856900E−7 | 0.14088900E−5 |
| A8 | −0.51360100E−7 | | 0.44808400E−7 |
| | Surface 26 | Surface 27 | |
| $\epsilon$ | 1.0000 | 1.0000 | |
| A4 | 0.24060400E−5 | 0.10446600E−3 | |
| A6 | −0.50696300E−5 | −0.93045500E−5 | |
| A8 | | 0.97379800E−7 | |

TABLE 7

| Example 4 | | Position f[mm] FNO | | (W)~(M)~(T) 6.67~16.64~66.52 3.37~4.38~5.50 | |
|---|---|---|---|---|---|
| i | ri[mm] | di[mm] | | Ni | vi | Component |

| i | ri[mm] | di[mm] | | Ni | vi | Component |
|---|---|---|---|---|---|---|
| 1 | 36.891 | 0.800 | | 1.84672 | 23.83 | Gr1(+) |
| 2 | 20.705 | 0.200 | | | | |
| 3 | 20.539 | 4.529 | | 1.51346 | 65.10 | |
| 4 | 949.117 | 0.200 | | | | |
| 5 | 25.288 | 2.965 | | 1.78550 | 43.60 | |
| 6 | 100.563 | 0.500~8.767~18.214 | | | | |
| 7 | 88.306 | 0.800 | | 1.88300 | 40.80 | Gr2(−) |
| 8 | 7.100 | 3.542 | * | | | |
| 9 | −14.108 | 0.700 | | 1.88287 | 40.80 | |
| 10 | 20.651 | 0.227 | | | | |
| 11 | 16.494 | 1.891 | | 1.84629 | 23.82 | |
| 12 | −44.796 | 6.100 | | | | |
| 13 | ∞ | 24.407~15.062~6.500 | | | | MR |
| 14 | ∞ | 0.500 | | 1.53952 | 46.93 | ST |
| 15 | 8.105 | 2.179 | | | | Gr3(+) |
| 16 | 40.032 | 4.341 | * | 1.49139 | 67.28 | |
| 17 | 12.119 | 3.231 | | 1.86078 | 28.55 | |
| 18 | −7.116 | 1.001 | | | | |
| 19 | −475.547 | 4.544 | | 1.88300 | 40.80 | |
| 20 | −28.671 | 1.010 | | | | |
| 21 | 18.681 | 0.509 | | 1.75017 | 25.13 | |
| 22 | 11.705 | 1.946 | * | | | |
| 23 | −113.141 | 1.252~10.565~25.296 | | | | |
| 24 | 27.324 | 3.154 | | 1.48750 | 70.44 | Gr4(+) |
| 25 | −8.357 | 0.500 | * | | | |
| 26 | −9.038 | 1.000 | * | 1.84666 | 23.82 | |
| 27 | −31.761 | 8.136~8.169~2.000 | | | | |
| 28 | ∞ | 1.357 | | 1.51680 | 64.20 | PT |
| 29 | ∞ | 1.000 | | | | |

TABLE 8

| Example 4 | Aspherical Surface Data of Surface i (*) | | |
|---|---|---|---|
| | Surface 8 | Surface 16 | Surface 22 |
| ε | 1.0000 | 1.0000 | 1.0000 |
| A4 | −0.81112700E−4 | −0.48756700E−4 | 0.29102300E−3 |
| A6 | −0.90474800E−6 | −0.18640800E−6 | 0.14721900E−5 |
| A8 | 0.66507500E−7 | | 0.44810000E−7 |
| | Surface 25 | Surface 26 | |
| ε | 1.0000 | 1.0000 | |
| A4 | 0.20916500E−3 | 0.41391500E−3 | |
| A6 | −0.40511500E−5 | −0.10789100E−4 | |
| A8 | | 0.16929500E−6 | |

TABLE 9

| Conditional Formula Values | | Example 1 | Example 2 | Example 3 | Example 4 |
|---|---|---|---|---|---|
| (1), (1a) | T1 | 19.142 | 18.266 | 20 | 17.714 |
| | T2 | 16.491 | 15.857 | 18.41 | 17.907 |
| | T1/T2 | 1.16 | 1.15 | 1.09 | 0.99 |
| (2), (2a) | L1w | 15.116 | 16.092 | 19.747 | 22.454 |
| | L1t | 34.258 | 34.358 | 39.747 | 40.168 |
| | L2 | 55.735 | 62.329 | 59.105 | 60.067 |
| | L1w/L2 | 0.27 | 0.26 | 0.33 | 0.37 |
| | L1t/L2 | 0.61 | 0.55 | 0.67 | 0.67 |
| (3), (3a) | fw | 7.08 | 7.41 | 6.96 | 6.67 |
| (3b) | ft | 70.69 | 73.93 | 69.46 | 66.52 |
| | ft/fw | 9.98 | 9.98 | 9.98 | 9.97 |
| (4), (4a) | D | 19.54 | 19.9 | 20 | 24 |
| | h | 4.5 | 4.5 | 4.5 | 4.5 |
| | D/h | 4.34 | 4.42 | 4.44 | 5.33 |

TABLE 9-continued

| Conditional Formula Values | | Example 1 | Example 2 | Example 3 | Example 4 |
|---|---|---|---|---|---|
| (5), (5a) | Tair | 23.286 | 25.772 | 25.036 | 33.795 |
| | D/Tair | 0.84 | 0.77 | 0.80 | 0.71 |

What is claimed is:

1. An image-taking lens unit comprising: a variable magnification optical system for forming an optical image of an object with a variable magnification; and an image sensor for converting the optical image into an electrical signal; the image-taking lens unit changing a shape thereof between a photographing state and a non-photographing state, wherein the variable magnification optical system has a plurality of lens groups for performing magnification variation by changing intervals therebetween and a reflective surface for bending an optical axis and comprises at least two movable groups, at least one of which is located closer to an object side than the reflective surface and at least one of which is located closer to an image side than the reflective surface, at least one of the plurality of lens groups being a movable group that moves during magnification variation, the reflective surface being kept in fixed position during magnification variation or focusing, and wherein, in transition from the photographing state to the non-photographing state, at least the reflective surface moves so that at least part of the movable group is stored into a space left after the movement of the reflective surface.

2. The image-taking lens unit according to claim 1, wherein at least one of the plurality of lens groups is a fixed group that is kept in fixed position during magnification variation, the fixed group comprising a plurality of optical elements, between which the reflective surface is located, and wherein relative position of the optical elements in the fixed group does not change during magnification variation or focusing but changes in the transition from the photographing state to the non-photographing state.

3. An image-taking apparatus having an image-taking lens unit in accordance with claim 2.

4. The image-taking lens unit according to claim 1, wherein, where as the movable group, at least two movable groups are provided, at least one of which is located closer to an object side than the reflective surface and at least one of which is located closer to an image side than the reflective surface, where, of the movable groups located closer to the object side than the reflective surface, the one located closest to the reflective surface is referred to as an object side movable group, and where, of the movable groups located closer to the image side than the reflective surface, the one located closest to the reflective surface is referred to as an image side movable group, the object side movable group and the image side movable group move monotonously in magnification variation from a wide-angle end to a telephoto end, and conditional formula (1) below is satisfied:

$$|T1/T2|<1.9 \qquad (1)$$

where

T1 represents an amount of movement of the object side movable group in the magnification variation from the wide-angle end to the telephoto end, and T2 represents an amount of movement of the image side movable group in the magnification variation from the wide-angle end to the telephoto end.

5. An image-taking apparatus having an image-taking lens unit in accordance with claim 4.

6. The image-taking lens unit according to claim 1, wherein, in magnification variation from a wide-angle end to a telephoto end, conditional formula (2) below is satisfied:

$$0.1 < L1/L2 < 1.9 \quad (2)$$

where
L1 represents a distance from a vertex of a most object side surface to a center of the reflective surface, and
L2 represents a distance from the center of the reflective surface to a center of the image sensor.

7. An image-taking apparatus having an image-taking lens unit in accordance with claim 6.

8. The image-taking lens unit according to claim 1, wherein conditional formula (3) below is satisfied:

$$5 < ft/fw \quad (3)$$

where
fw represents a focal length of the entire variable magnification optical system at a wide-angle end, and
ft represents a focal length of the entire variable magnification optical system at a telephoto end.

9. The image-taking lens unit according to claim 1, wherein conditional formula (3b) below is satisfied:

$$7 < ft/fw \quad (3b)$$

where
fw represents a focal length of the entire variable magnification optical system at a wide-angle end, and
ft represents a focal length of the entire variable magnification optical system at a telephoto end.

10. An image-taking lens unit comprising: a variable magnification optical system for forming an optical image of an object with a variable magnification; and an image sensor for converting the optical image into an electrical signal; the image-taking lens unit changing a shape thereof between a photographing state and a non-photographing state,
wherein the variable magnification optical system has a plurality of lens groups for performing magnification variation by changing intervals therebetween and a reflective surface for bending an optical axis, at least one of the plurality of lens groups being a movable group that moves during magnification variation, the reflective surface being kept in fixed position during magnification variation or focusing,
wherein, in transition from the photographing state to the non-photographing state, at least the reflective surface moves so that at least part of the movable group is stored into a space left after the movement of the reflective surface, and
wherein the movable group at least part of which is stored into the space left after the movement of the reflective surface is located closer to the object side than the reflective surface.

11. The image-taking lens unit according to claim 10, wherein, in the transition from the photographing state to the non-photographing state, a movement direction of the reflective surface differs from a movement direction of the movable group at least part of which is stored into the space left after the movement of the reflective surface.

12. The image-taking lens unit according to claim 10, wherein a movement direction of the reflective surface in the transition from the photographing state to the non-photographing state is parallel to a plane perpendicular to an optical axis located closer to the object side than the reflective surface.

13. The image-taking lens unit according to claim 10, wherein the movable group at least part of which is stored into the space left after the movement of the reflective surface is located closer to an object side than the reflective surface and conditional formula (4) below is satisfied:

$$2.5 < D/h < 7.3 \quad (4)$$

where
D represents an effective diameter of an most object side lens element, and
h represents a maximum image height on a light receiving surface of the image sensor (that is, one half of a diagonal line of a screen of the image sensor).

14. The image-taking lens unit according to claim 10, wherein the movable group at least part of which is stored into the space left after the movement of the reflective surface is located closer to an object side than the reflective surface and that conditional formula (5) below is satisfied:

$$0.35 < D/Tair < 1.00 \quad (5)$$

where
D represents an effective diameter of a most object side lens element, and
Tair represents a sum of variable air spacing located closer to an image side than the reflective surface.

15. An image-taking lens unit comprising: a variable magnification optical system for forming an optical image of an object with a variable magnification; and an image sensor for converting the optical image into an electrical signal; the image-taking lens unit changing a shape thereof between a photographing state and a non-photographing state,
wherein the variable magnification optical system has a plurality of lens groups for performing magnification variation by changing intervals therebetween and a reflective surface for bending an optical axis, at least one of the plurality of lens groups being a movable group that moves during magnification variation, the reflective surface being kept in fixed position during magnification variation or focusing,
wherein, in transition from the photographing state to the non-photographing state, at least the reflective surface moves so that at least part of the movable group is stored into a space left after the movement of the reflective surface, and
wherein the variable magnification optical system includes: in order from an object side, a first lens group having a positive optical power; a second lens group having a negative optical power; the reflective surface; and a third lens group having a positive or negative optical power, the second lens group being a fixed group that is kept in fixed position during magnification variation, at least the first and third lens groups being movable groups.

16. The image-taking lens unit according to claim 15, wherein the variable magnification optical system includes: in order from an object side, a first lens group having a positive optical power; a second lens group having a negative optical power; and a third lens group having a positive or negative optical power, the second lens group being a fixed group that is kept in fixed position during magnification variation, at least the first and third lens groups being movable groups, and wherein the reflective surface is located in the second lens group.

17. An image-taking apparatus having an image-taking lens unit in accordance with claim 16.

18. An image-taking apparatus having an image-taking lens unit in accordance with claim 15.

* * * * *